US011675359B2

(12) United States Patent
Towal et al.

(10) Patent No.: US 11,675,359 B2
(45) Date of Patent: Jun. 13, 2023

(54) PATH DETECTION FOR AUTONOMOUS MACHINES USING DEEP NEURAL NETWORKS

(71) Applicant: NVIDIA Corporation, San Jose, CA (US)

(72) Inventors: Regan Blythe Towal, San Diego, CA (US); Maroof Mohammed Farooq, Boulder, CO (US); Vijay Chintalapudi, Sunnyvale, CA (US); Carolina Parada, Boulder, CO (US); David Nister, Bellevue, WA (US)

(73) Assignee: NVIDIA Corporation, Santa Clara, CA (US)

( * ) Notice: Subject to any disclaimer, the term of this patent is extended or adjusted under 35 U.S.C. 154(b) by 760 days.

(21) Appl. No.: 16/433,994

(22) Filed: Jun. 6, 2019

(65) Prior Publication Data
US 2019/0384304 A1    Dec. 19, 2019

Related U.S. Application Data

(60) Provisional application No. 62/684,328, filed on Jun. 13, 2018.

(51) Int. Cl.
*G05D 1/02*    (2020.01)
*G06T 7/60*    (2017.01)
(Continued)

(52) U.S. Cl.
CPC ............ *G05D 1/0221* (2013.01); *G06N 3/04* (2013.01); *G06T 7/60* (2013.01); *G06V 10/764* (2022.01);
(Continued)

(58) Field of Classification Search
None
See application file for complete search history.

(56) References Cited

U.S. PATENT DOCUMENTS 7,724,180 B2    5/2010   Yonak et al.
10,885,698 B2   1/2021   Muthler et al.
(Continued)

FOREIGN PATENT DOCUMENTS

EP        0717261 B1       12/1999
WO        2016183074 A1    11/2016
WO        2017220705 A1    12/2017

OTHER PUBLICATIONS

"Systems and Methods for Safe and Reliable Autonomous Vehicles," U.S. Appl. No. 62/584,549, filed Nov. 10, 2017.
(Continued)

*Primary Examiner* — Adam D Tissot
*Assistant Examiner* — Garrett F Evans
(74) *Attorney, Agent, or Firm* — Taylor English Duma L.L.P.

(57) ABSTRACT

In various examples, a deep learning solution for path detection is implemented to generate a more abstract definition of a drivable path without reliance on explicit lane-markings—by using a detection-based approach. Using approaches of the present disclosure, the identification of drivable paths may be possible in environments where conventional approaches are unreliable, or fail—such as where lane markings do not exist or are occluded. The deep learning solution may generate outputs that represent geometries for one or more drivable paths in an environment and confidence values corresponding to path types or classes that the geometries correspond. These outputs may be directly useable by an autonomous vehicle—such as an autonomous driving software stack—with minimal post-processing.

20 Claims, 26 Drawing Sheets

(51) Int. Cl.
  *G06N 3/04* (2023.01)
  *G06V 20/56* (2022.01)
  *G06V 10/764* (2022.01)
  *G06V 10/82* (2022.01)

(52) U.S. Cl.
  CPC .............. *G06V 10/82* (2022.01); *G06V 20/56* (2022.01); *G06V 20/588* (2022.01)

(56) References Cited

U.S. PATENT DOCUMENTS

| | | | |
|---|---|---|---|
| 11,210,537 | B2 | 12/2021 | Koivisto et al. |
| 2013/0325753 | A1* | 12/2013 | Sullivan .............. G06Q 30/0283 705/400 |
| 2016/0321074 | A1 | 11/2016 | Hung et al. |
| 2016/0325753 | A1* | 11/2016 | Stein ........................ B60T 8/172 |
| 2018/0121273 | A1 | 5/2018 | Fortino et al. |
| 2018/0370540 | A1 | 12/2018 | Yousuf et al. |
| 2020/0317194 | A1* | 10/2020 | Yan ...................... B60W 30/143 |

OTHER PUBLICATIONS

"System and Method for Controlling Autonomous Vehicles", U.S. Appl. No. 62/614,466, filed Jan. 7, 2018.
"System and Method for Safe Operation of Autonomous Vehicles", U.S. Appl. No. 62/625,351, filed Feb. 2, 2018.
"Conservative Control for Zone Driving of Autonomous Vehicles Using Safe Time of Arrival", U.S. Appl. No. 62/628,831, filed Feb. 9, 2018.
"System and Method for Sharing Camera Data Between Primary and Backup Controllers in Autonomous Vehicle Systems", U.S. Appl. No. 62/629,822, filed Feb. 13, 2018.
"Pruning Convolutional Neural Networks for Autonomous Vehicles and Robotics", U.S. Appl. No. 62/630,445, filed Feb. 14, 2018.
"Methods for accurate real-time object detection and for determining confidence of object detection suitable for autonomous vehicles" U.S. Appl. No. 62/631,781, filed Feb. 18, 2018.
"System and Method for Autonomous Shuttles, Robo-Taxis, Ride-Sharing and On-Demand Vehicles", U.S. Appl. No. 62/635,503, filed Feb. 26, 2018.
"Convolutional Neural Networks to Detect Drivable Freespace for Autonomous Vehicles", U.S. Appl. No. 62/643,665, filed Mar. 15, 2018.
"Deep Neural Network for Estimating Depth from Stereo Using Semi-Supervised Learning", U.S. Appl. No. 62/646,148, filed Mar. 21, 2018.
"Video Prediction Using Spatially Displaced Convolution", U.S. Appl. No. 62/646,309, filed Mar. 21, 2018.
"Geometric Shadow Filter for Denoising Ray-Traced Shadows", U.S. Appl. No. 62/644,385, filed Mar. 17, 2018.
"Energy Based Reflection Filter for Denoising Ray-Traced Glossy Reflections", U.S. Appl. No. 62/644,386, filed Mar. 17, 2018.
"Distance Based Ambient Occlusion Filter for Denoising Ambient Occlusions", U.S. Appl. No. 62/644,601, filed Mar. 19, 2018.
"Adaptive Occlusion Sampling of Rectangular Area Lights with Voxel Cone Tracing", U.S. Appl. No. 62/644,806, filed Mar. 19, 2018.
"System and Methods for Advanced AI-Assisted Vehicles", U.S. Appl. No. 62/648,358, filed Mar. 26, 2018.
"System and Method for Training, Testing, Verifying, and Validating Autonomous and Semi-Autonomous Vehicles", U.S. Appl. No. 62/648,399, filed Mar. 27, 2018.
"Method and System of Remote Operation of a Vehicle Using an Immersive Virtual Reality Environment", U.S. Appl. No. 62/648,493, filed Mar. 27, 2018.
"System and Methods for Virtualized Intrusion Detection and Prevent System in Autonomous Vehicles", U.S. Appl. No. 62/682,803, filed Jun. 8, 2018.
International Preliminary Report on Patentability received for PCT Application No. PCT/US2019/035868, dated Dec. 24, 2020, 8 pages.
International Search Report and Written Opinion dated Oct. 2, 2019 in International Patent Application No. PCT/US19/35868, 20 pages.
IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.
ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).
"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).
"Methodology of Using a Single Controller (ECU) For a Fault-Tolerant/Fail-Operational Self-Driving System", U.S. Appl. No. 62/524,283, filed Jun. 23, 2017.
"Video Prediction Using Spatially Displaced Convolution", U.S. Appl. No. 62/647,545, filed Mar. 23, 2018.

\* cited by examiner

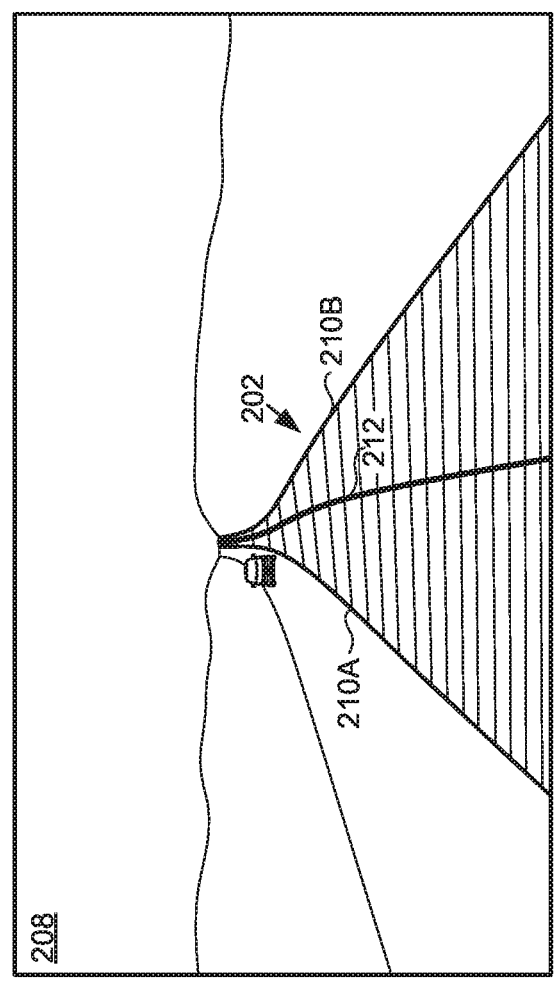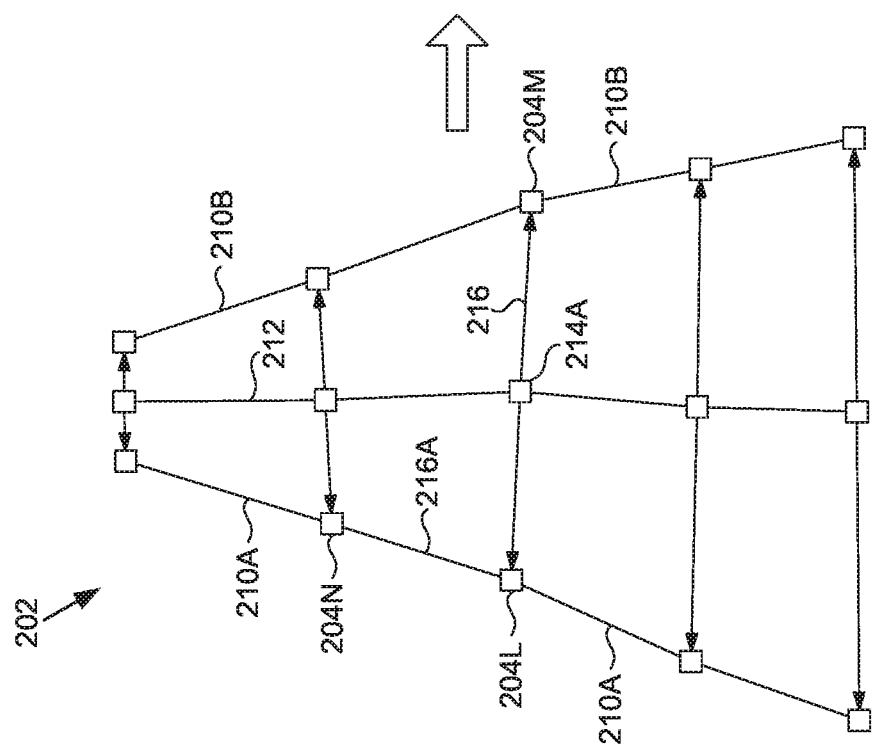
FIGURE 2B

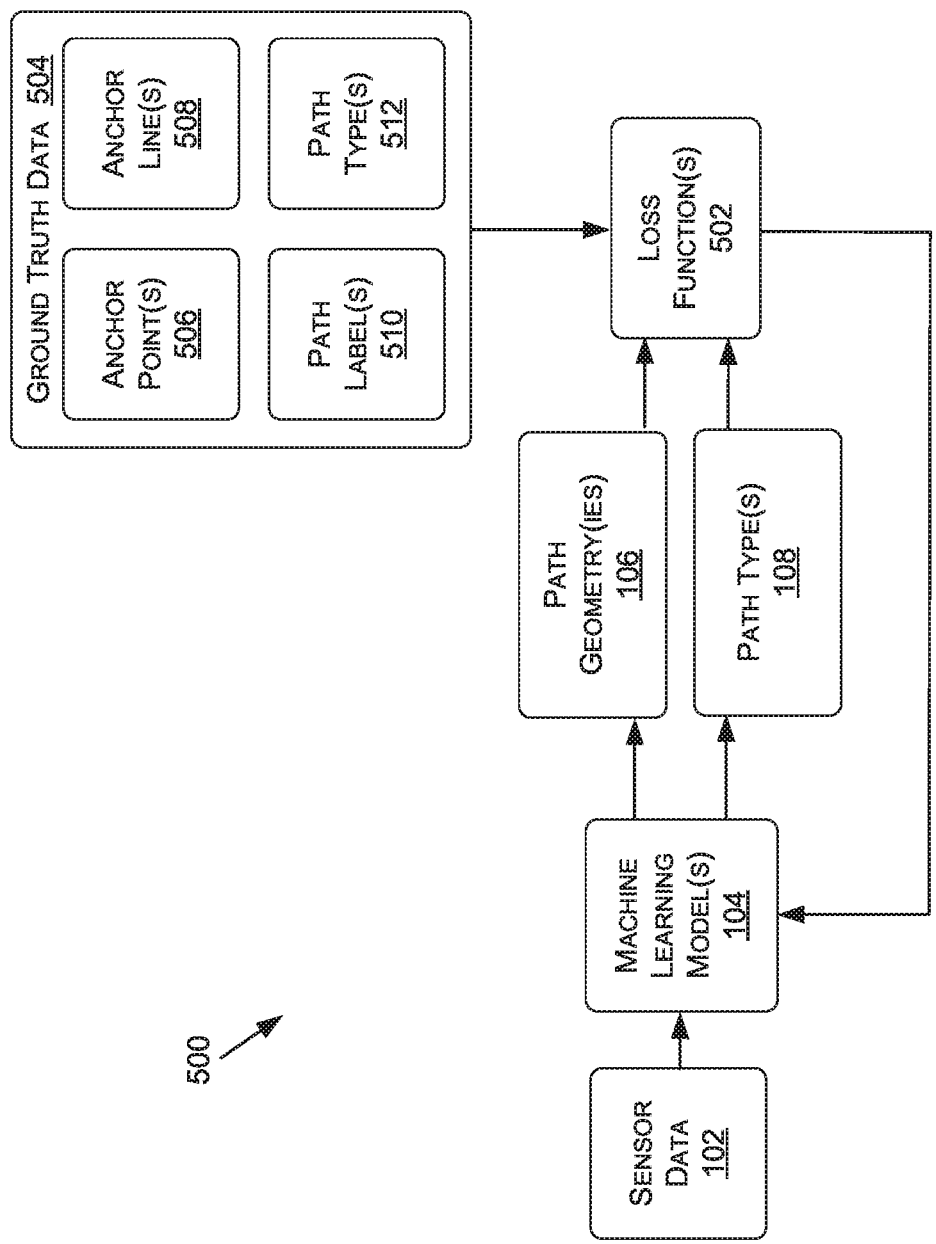

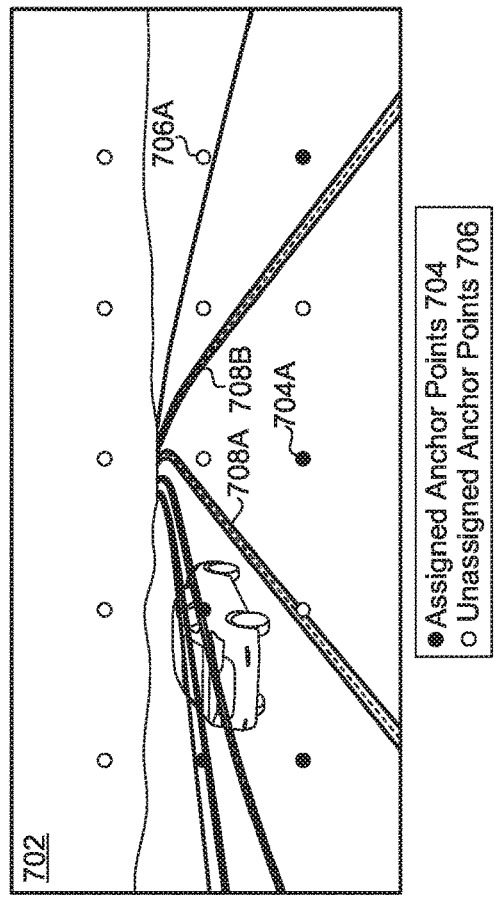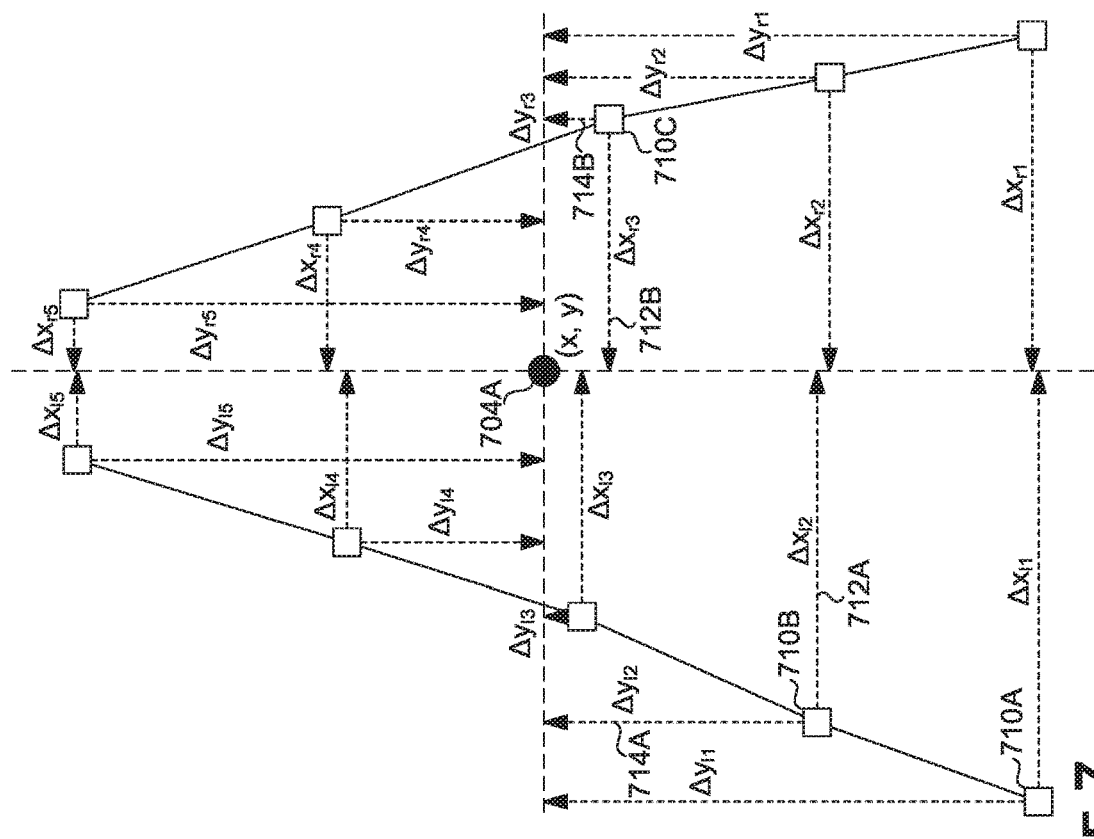
FIGURE 7

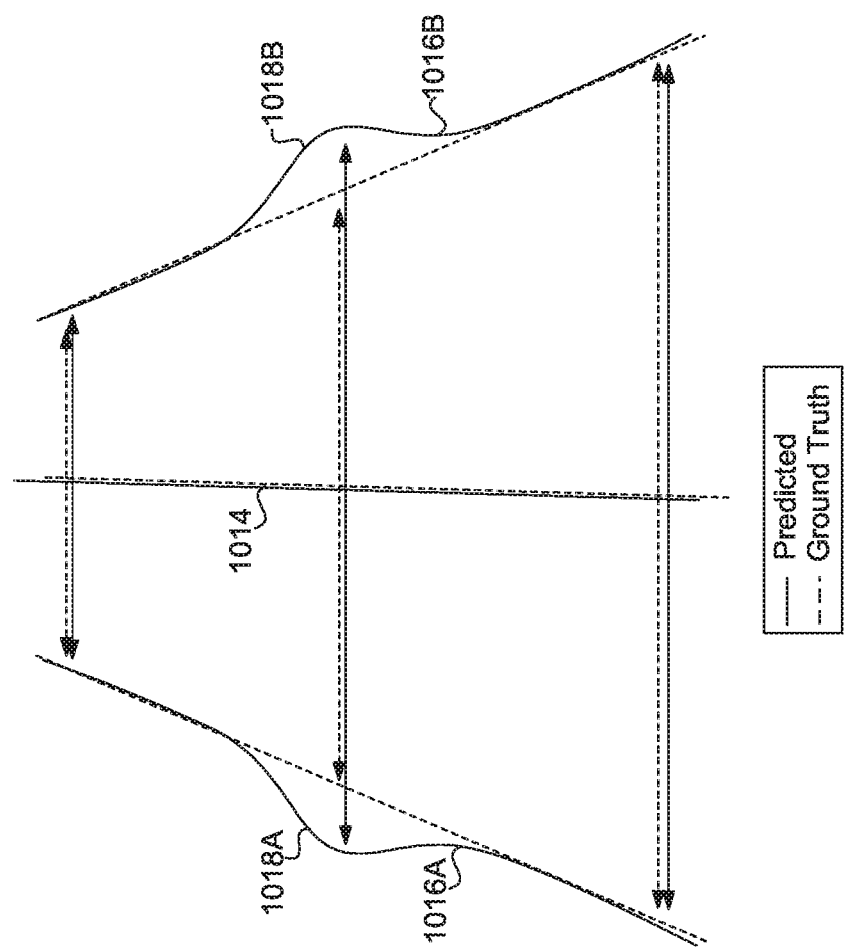

PATH DETECTION FOR AUTONOMOUS MACHINES USING DEEP NEURAL NETWORKS

CROSS-REFERENCE TO RELATED APPLICATIONS

This application claims the benefit of U.S. Provisional Application No. 62/684,328, filed on Jun. 13, 2018, which is hereby incorporated by reference in its entirety.

This application is related to U.S. Non-Provisional application Ser. No. 16/378,188, filed on Apr. 8, 2019, which is hereby incorporated by reference in its entirety.

BACKGROUND

Designing a system to drive a vehicle autonomously without supervision at level of safety required for practical acceptance is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures along its path.

Among the most important tasks required of an autonomous system is determining drivable paths within complex environments that an autonomous vehicle may encounter. Some conventional systems for path detection rely on computer vision algorithms that use edge detection and manually engineered filters to identify lanes or lane markings. For example, computer vision algorithms may be used to rasterize images and assign pixels that correspond to lane markings as boundaries of a lane. In other conventional approaches, deep learning may be used to generate segmentation masks (e.g., that classify each pixel in an image), perform extensive post-processing on the segmentation masks to identify lane markings, and then assign the identified lane markings as boundaries of a lane.

However, these conventional approaches are limited to driving surfaces or environments that include visible lane markings (e.g., that have non-occluded lane markings). This limitation reduces or eliminates the effectiveness of these systems in environments where lane markings do not exist (e.g., unmarked roads), where lane markings are occluded (e.g., by debris, snow, other vehicles, etc.), and/or where lane markings are never present (e.g., within a cross-traffic intersection). In addition, because the output of these conventional systems require substantial post-processing (e.g., filtering, smoothing, curve fitting, connected components labeling, etc.) to generate useable data (e.g., piecewise linear functions, arbitrary polygons, or clothoid curves), the runtime of the systems may be increased, and additional computing and processing requirements may be consumed—thereby reducing the efficiency of these conventional systems.

SUMMARY

Embodiments of the present disclosure relate to path detection for autonomous machines using deep neural networks. Systems and methods are disclosed that use object detection techniques to identify or detect drivable paths within environments for use by autonomous vehicles, semi-autonomous vehicles, robots, and/or other object types.

In contrast to conventional systems, such as those described above, the system of the present disclosure may implement a deep learning solution (e.g., using a deep neural network (DNN), such as a convolutional neural network (CNN)) for autonomous vehicles that uses a more abstract definition of a drivable path that removes the reliance on explicit lane-markings. In further contrast to conventional systems, the system of the present disclosure may identify drivable paths using a detection-based approach. The drivable paths of the present disclosure may refer to any explicit or implied path that may be taken by a vehicle, which may include, without limitation, two implied paths at lane splits or lane merges, cross-traffic paths at intersections, paths where lane markings are occluded, or paths where lane markings do not exist (e.g., on rural roads, residential neighborhood roads, dirt roads, etc.). The drivable paths may be defined or delineated with edges or boundaries of the path (e.g., a left edge, a right edge, etc.), may be identified as a centerline along the path (e.g., between a left edge and a right edge), and/or may be otherwise identified.

Using the approaches described herein, the identification of drivable paths may be possible in environments where conventional approaches are unreliable or would otherwise fail—such as where lane markings do not exist or are occluded. In addition, in embodiments where a DNN is used, the output of the DNN may include geometries for each of the drivable paths identified that may be useable by an autonomous vehicle with little to no post-processing. As a direct result, and compared to conventional systems, substantial computing power may be saved and processing requirements may be reduced—thereby speeding up runtime to allow for real-time deployment while simultaneously reducing the overall burden on the system.

BRIEF DESCRIPTION OF THE DRAWINGS

The present systems and methods for path detection for autonomous machines using deep neural networks is described in detail below with reference to the attached drawing figures, wherein:

FIG. 2B is an illustration of an example rail calculation and an example visualization of drivable paths, in accordance with some embodiments of the present disclosure;

FIG. 5 is a data flow diagram illustrating a process for training a machine learning model for path detection, in accordance with some embodiments of the present disclosure;

FIG. 7 includes an example illustration of encoding anchor points for use as ground truth data for training a machine learning model, in accordance with some embodiments of the present disclosure;

FIGS. 10A-10E include example illustrations of key performance indicators (KPIs), in accordance with some embodiments of the present disclosure;

DETAILED DESCRIPTION

Figure 1A:
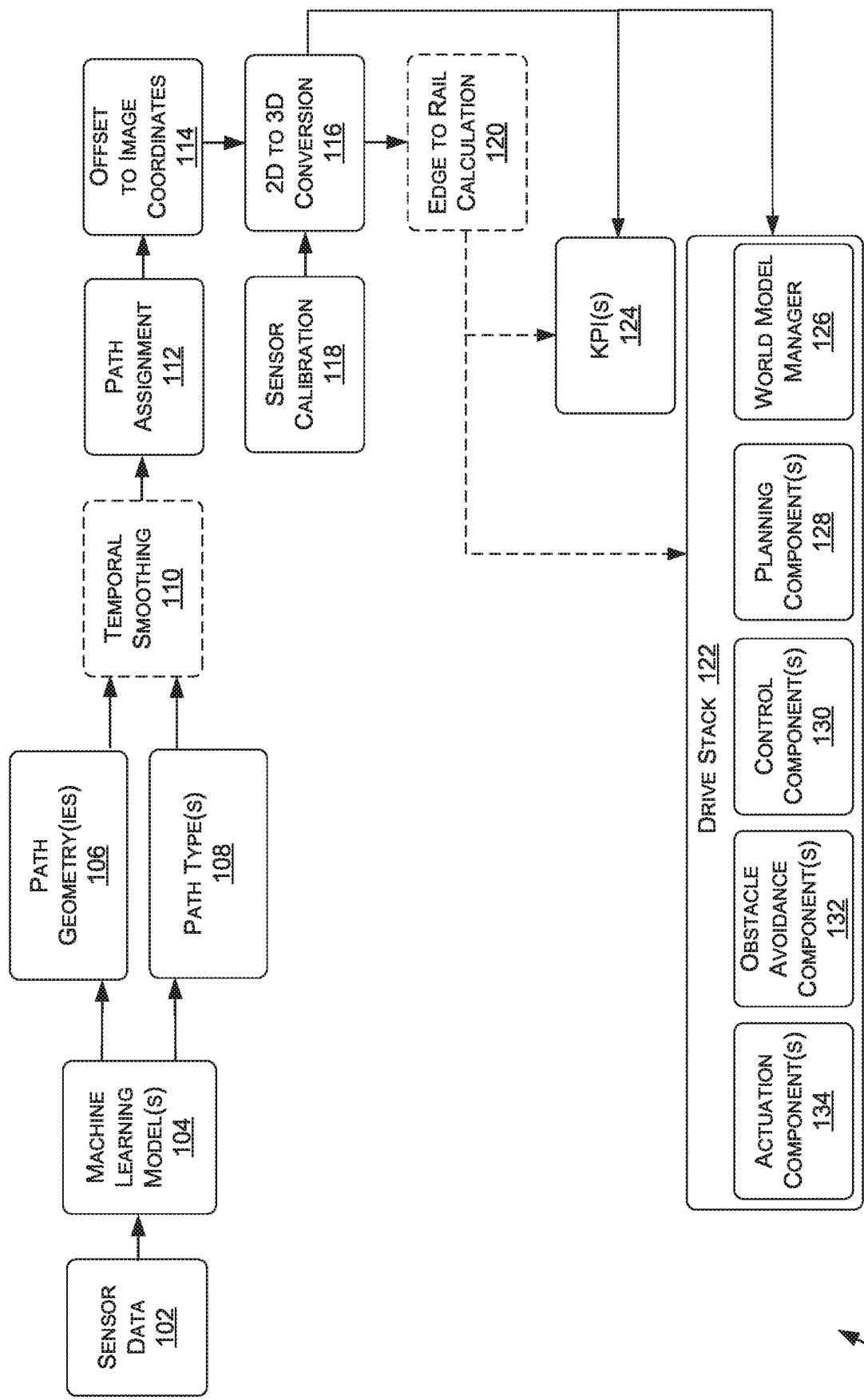
FIG. 1A is a data flow diagram illustrating an example process for a path detection system, in accordance with some embodiments of the present disclosure.

Systems and methods are disclosed related to path detection for autonomous machines using deep neural networks. More specifically, the present disclosure relates to detecting drivable paths within an environment for use in navigating, mapping, planning, and/or performing one or more additional or alternative operations by an autonomous machine. Although the present disclosure may be described with respect to an example autonomous vehicle 1100 (alternatively referred to herein as "vehicle 1100" or "autonomous vehicle 1100," an example of which is described herein with respect to FIGS. 11A-11D, this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., path planning for a robot), aerial systems (e.g., path planning for a drone or other aerial vehicle), boating systems (e.g., path planning for a boat or other water vessel), and/or other technology areas, such as for localization, path planning, and/or other processes.

Path Detection System

The present disclosure relates to a path detection system for use in identifying drivable paths for autonomous vehicles within an environment. A determination of drivable paths may be useful for an autonomous vehicle for path planning (e.g., determining a path for the vehicle through the environment), lane keeping (e.g., staying within a certain lane of a driving surface), lane changing (e.g., to determine a trajectory between a first drivable path, such as a first lane, and a second drivable path, such as a second lane), path warnings in semi-autonomous vehicles (e.g., a warning may be output to a passenger or driver when a vehicle is exiting a drivable path, such as drifting to an adjacent lane), mapping (e.g., predicting all drivable paths in an image to map the environment represented by the image), and/or to perform other operations or functions.

In some embodiments, one or more deep neural networks (DNNs) may be used by the path detection system. For example, the DNN (e.g., a convolutional neural network (CNN)) may receive image data representative of images of a field of view of one or more image sensors of an autonomous vehicle as the autonomous vehicle moves through a physical environment. The DNN may use the image data to generate one or more predicted paths (e.g., a predicted path for each anchor point, or each anchor line) as well as to generate confidence values corresponding to likelihoods that each predicted path belongs to each of one or more path types (e.g., an ego-path, a path to the left of the ego-path, a lane to the right of the ego-path, each of the drivable paths in the environment, etc.). For example, for an anchor point associated with an image, the DNN may generate a first output array that includes delta values (in x and y directions) from the anchor point to each of a plurality of vertices of a predicted path. As such, the delta values may be used to define the geometry of the predicted path that corresponds to the anchor point. In addition, for the anchor point, a confidence value array may be output by the DNN that includes a confidence, for each path type the DNN is trained to predict, that the predicted path is of the path type. The DNN may generate the geometry and confidence value outputs for each anchor point, or for each anchor line (e.g., having a plurality of anchor points), and the geometry of the predicted paths with the highest confidence value (e.g., using an ArgMax function) for each path type may be assigned as the geometry for the path type with respect to the image. In other examples, the predicted path that corresponds to the path type may be determined using non-maximum suppression, density-based spatial clustering of application with noise (DBSCAN), and/or another function.

Once the geometry for each path type is determined, the 2D pixel coordinates defining the geometries may be converted to 3D world coordinates for use by the autonomous vehicle in performing one or more operations (e.g., lane keeping, lane changing, path planning, mapping, etc.).

In non-limiting embodiments, the DNN may include a CNN. For example, the CNN may include, without limitation, a feature extractor including convolutional layers, pooling layers, and/or other layer types, where the output of the feature extractor is provided as input to a first layer(s) for predicting confidence values for path types and a second layer(s) for predicting the delta values for the anchor points, or anchor lines. The first layer(s) and the second layer(s) may receive parallel inputs, in some examples, and thus may product different outputs from similar input data. The outputs of the first layer(s) and the second layer(s) may be concatenated at one or more layers of the DNN to generate a final output of the DNN that represents the geometries of the predicted paths as well as confidence values for each of the predicted paths with respect to each path type the DNN is trained to predict.

Now referring to FIG. 1A, FIG. 1A is a data flow diagram illustrating an example process 100 for a path detection system, in accordance with some embodiments of the present disclosure. At a high level, the process 100 may include one or more machine learning models 104 receiving one or more inputs, such as sensor data 102, and generating one or more outputs, such as one or more path geometries 106 and/or one or more path types 108. The sensor data 102 may include image data generated by one or more cameras of an autonomous vehicle (e.g., vehicle 1100, as described herein at least with respect to FIGS. 11A-11D). In some embodiments, the sensor data 102 may additionally or alternatively include other types of sensor data, such as LIDAR data from one or more LIDAR sensors 1164, RADAR data from one or more RADAR sensors 1160, audio data from one or more microphones 1196, etc. The machine learning model(s) 104 may be trained to generate the path geometry(ies) 106 (e.g., as defined by one or more vertices of a line or points of a polyline, represented by delta values from anchor points, or anchor lines, as described herein) and/or the path type(s) (e.g., confidence values that a geometry of a path corresponds to one or more path types, such as an ego-path, paths adjacent the ego-path, all paths in an environment or field(s) of view of the camera(s), etc.). These outputs may be used by control component(s) of an autonomous vehicle (e.g., controller(s) 1136, ADAS system 1138, SOC(s) 1104, software stack 122, and/or other components of the autonomous vehicle 1100) to aid the autonomous vehicle in performing one or more operations (e.g., path planning, mapping, etc.) within an environment.

In embodiments where the sensor data 102 includes image data, the image data may include data representative of images of a field of view of one or more cameras of a vehicle, such as stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, and/or other camera type of the autonomous vehicle 1100 (FIGS. 11A-11D). In some examples, the image data may be captured by a single camera with a forward-facing, substantially centered field of view with respect to a horizontal axis (e.g., left to right) of the vehicle 1100. In a non-limiting embodiment, one or more forward-facing cameras may be used (e.g., a center or near-center mounted camera(s)), such as a wide-view camera 1170, a surround camera 1174, a stereo camera 1168, and/or a long-range or mid-range camera 1198. The image data captured from this perspective may be useful for perception when navigating—e.g., within a lane, through a lane change, through a turn, through an intersection, etc.—because a forward-facing camera may include a field of view (e.g., the field of view of the forward-facing stereo camera 1168 and/or the wide-view camera 1170 of FIG. 11B) that includes both a current lane of travel of the vehicle 1100, adjacent lane(s) of travel of the vehicle 1100, and/or boundaries of the driving surface. In some examples, more than one camera or other sensor (e.g., LIDAR sensor, RADAR sensor, etc.) may be used to incorporate multiple fields of view (e.g., the fields of view of the long-range cameras 1198, the forward-facing stereo camera 1168, and/or the forward facing wide-view camera 1170 of FIG. 11B).

In some examples, the image data may be captured in one format (e.g., RCCB, RCCC, RBGC, etc.), and then converted (e.g., during pre-processing of the image data) to another format. In some other examples, the image data may be provided as input to a sensor data pre-processor (not shown) to generate pre-processed image data. Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format such as H.264/ Advanced Video Coding (AVC) or H.265/High Efficiency Video Coding (HEVC), raw images such as originating from Red Clear Blue (RCCB), Red Clear (RCCC) or other type of imaging sensor. In some examples, different formats and/or resolutions could be used for training the machine learning model(s) 104 than for inferencing (e.g., during deployment of the machine learning model(s) 104 in the autonomous vehicle 1100).

The sensor data pre-processor may use image data representative of one or more images (or other data representations) and load the sensor data into memory in the form of a multi-dimensional array/matrix (alternatively referred to as tensor, or more specifically an input tensor, in some examples). The array size may be computed and/or represented as W x H x C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W x H x C x B. Any ordering of the dimensions may be possible, which may depend on the particular hardware and software used to implement the sensor data pre-processor. This ordering may be chosen to maximize training and/or inference performance of the machine learning model(s) 104.

Figure 1B:
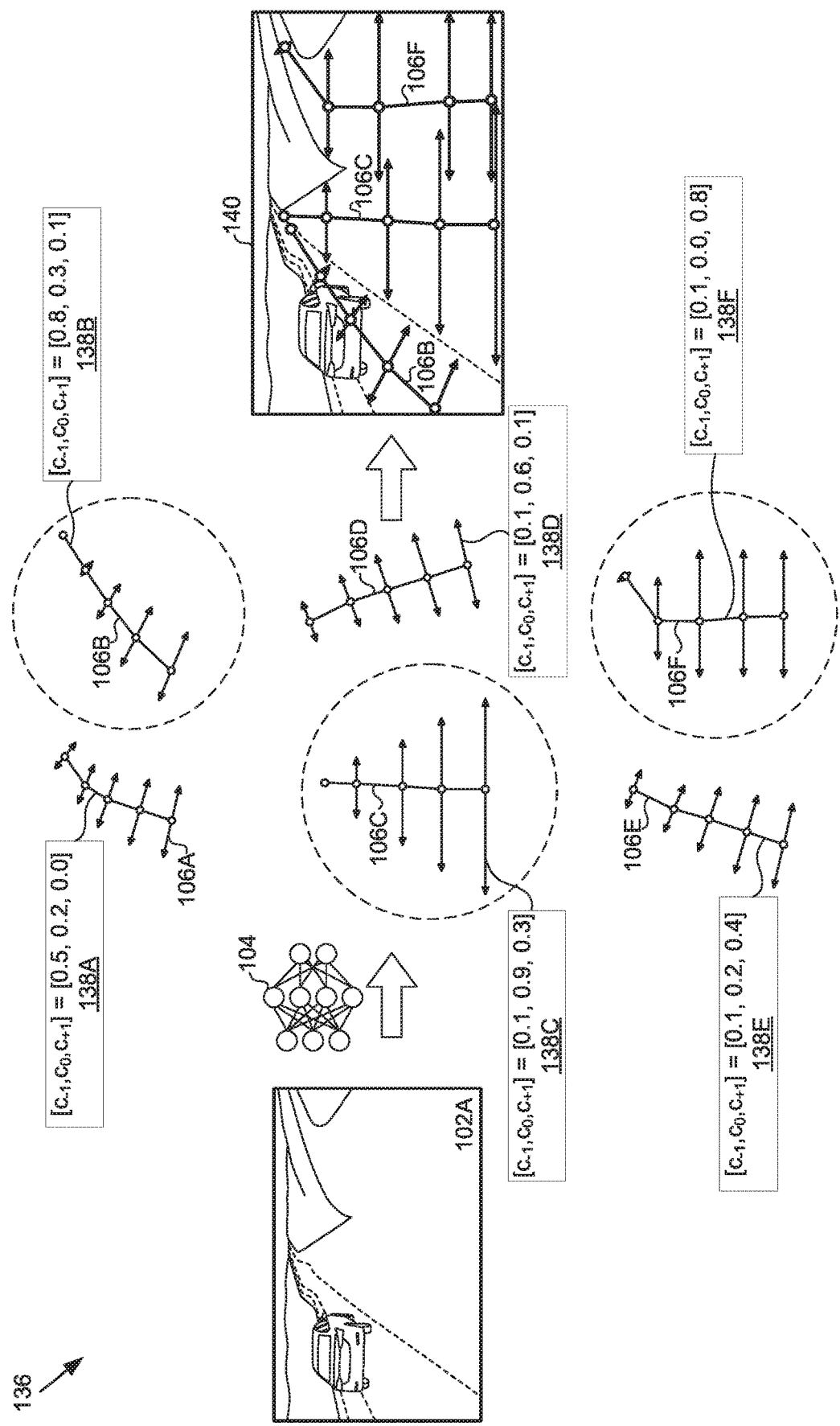
FIG. 1B is another data flow diagram illustrating an example process for a path detection system, in accordance with some embodiments of the present disclosure.
Figure 1C:
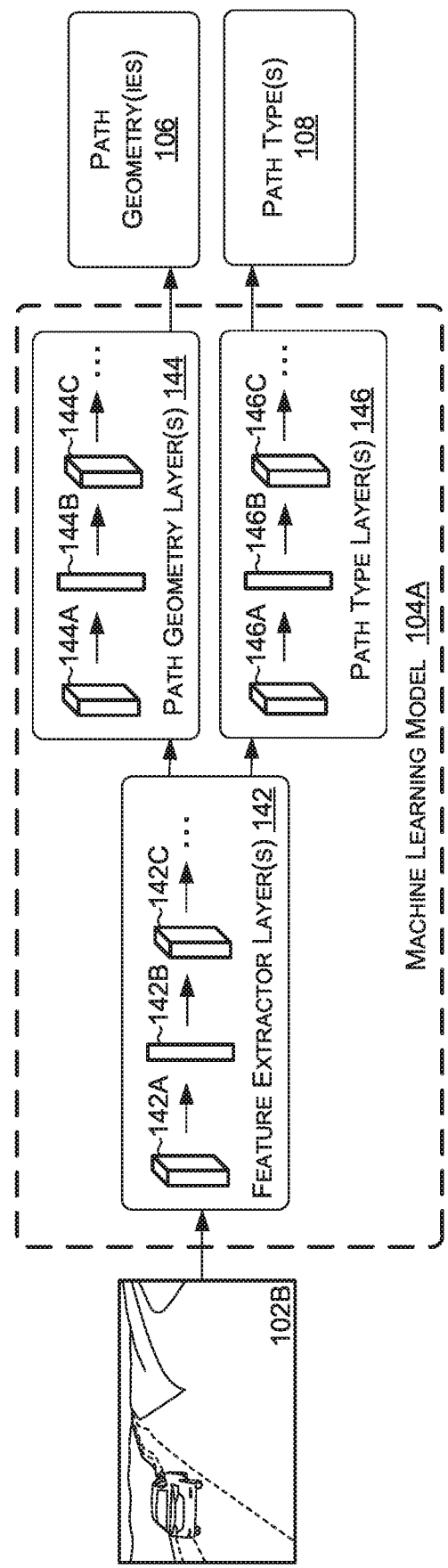
FIGS. 1C-1D are illustrations of example machine learning model(s), in accordance with some embodiments of the present disclosure.

In some embodiments, a pre-processing image pipeline may be employed by the sensor data pre-processor to process a raw image(s) acquired by a sensor(s) (e.g., camera(s)) and included in the image data 102 to produce pre-processed image data which may represent an input image(s) to the input layer(s) (e.g., feature extractor layer(s) 142 of FIG. 1C) of the machine learning model(s) 104. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

The machine learning model(s) 104 may use as input one or more images or other data representations (e.g., LIDAR data, RADAR data, etc.) as represented by the sensor data 102 to generate the output(s). In a non-limiting example, the machine learning model(s) 104 may take, as input, an image(s) represented by the sensor data 102 (e.g., after pre-processing) to generate the path geometry(ies) 106 and/or the path type(s) 108. Although examples are described herein with respect to using neural networks, and specifically CNNs, as the machine learning model(s) 104 (e.g., with respect to FIGS. 1C and 1D), this is not intended to be limiting. For example, and without limitation, the machine learning model(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

The outputs of the machine learning model(s) 104 may include the path geometry(ies) 106, the path type(s) 108, and/or other output types. The path geometry(ies) 106, in some non-limiting embodiments, may be output by the machine learning model(s) 104 as delta values. The delta values may be representative of pixel distances in any direction (e.g., in x and/or y directions) with respect to an anchor point, or with respect to anchor points of an anchor line (e.g., a line having one or more anchor points along it). For example, the machine learning model(s) 104 may be trained to predict delta values that correspond to locations of vertices of an edge or rail (e.g., center) of a drivable path. For a given anchor point, the machine learning model(s) 104 may output a series of delta values (e.g., x values and y values) for each vertex of a path. Because the pixel coordinates or location of the anchor points or anchor lines may be known by the path detection system, the delta values may be used to identify the pixel coordinates or locations corresponding to the vertices. In some examples, the vertices may correspond to points of a polyline, and by connecting the points, polylines may be generated which define a polygon (e.g., an arbitrary polygon corresponding to a drivable path, such as a lane, for a vehicle).

The path type(s) 108 may include any number of path types or classes, such as but not limited to those described herein. For example, the path types(s) 108 may include an ego-path (e.g., the current path of the vehicle), paths that are adjacent the ego-path (e.g., one, two, three, or more paths to the left and/or the right of the ego-path), and/or other paths, such as exit paths, merge paths, lane split paths, paths of opposing traffic (e.g., on an opposite side of a road), etc. In some embodiments, the path type(s) 108 may be output as confidence values. For example, for each anchor point or anchor line, confidence values may be output for each of the path types or classes the machine learning model(s) 104 is trained to predict. As a non-limiting example, if the machine learning model(s) 104 is trained to predict three path types or classes (e.g., ego-path, left of ego-path, right of ego-path), there may be an output array including confidence values for each of the three path types or classes for each anchor point or anchor line. As a result, there may be a path geometry 106 and confidence values (e.g., corresponding to the path types 108) for each anchor point or anchor line, and the path geometry 106 corresponding to the anchor point or anchor line, with the highest confidence value for a specific path type may be used as the path geometry for that path type. This is described in more detail herein at least with respect to path assignment 112 of the process 100.

In some embodiments, the path geometry(ies) 106 and/or the path type(s) 108 may undergo temporal smoothing 110 after being computed by the machine learning model(s) 104 (e.g., the delta values of the path geometry(ies) 106 and/or the confidence values of the path type(s) 108 may undergo temporal smoothing 110). The temporal smoothing 110 may be used in some embodiments to improve stability at further distances, to reduce flickering of paths under sudden exposure changes, and/or otherwise to smooth and reduce noise in the output of the machine learning model(s) 104. In some examples, values computed by the machine learning model(s) 104 for a current instance of the sensor data 102 may be weighed against values computed by the machine learning model(s) 104 for one or more prior instances of the sensor data 102. Where the sensor data 102 is image data representative of images, for example, the path geometry(ies) 106 and/or the path type(s) 108 computed by the machine learning model(s) 104 for a current or most recent image may be weighed against the path geometry(ies) 106 and/or the path type(s) 108 computed by the machine learning model(s) 104 for one or more previous images. Temporal smoothing 110, in some non-limiting embodiments, may be executed using equation (1), below:

$$\text{final\_value} = a * \text{value\_image}_{previous} + (1-a) * \text{value\_image}_{current} \quad (1)$$

where a is a weighting factor, final_value is a value of a path geometry 106 and/or a path type 108 after temporal smoothing, $\text{value\_image}_{previous}$ is a value computed for a path geometry 106 and/or a path type 108 by the machine learning model(s) 104 for a previous frame(s), and $\text{value\_image}_{current}$ is a value computed for a path geometry 106 and/or a path type 108 by the machine learning model(s) 104 for a current frame.

The path geometry(ies) 106 to be associated with each of the path type(s) 108 may be determined at path assignment 112 of the process 100 (in some examples, after temporal smoothing 110 has been used to update the values computed by the machine learning model(s) 104). In some examples, an ArgMax function may be used (e.g., a winner-take-all approach), where the path geometry 106 associated with a highest confidence value for a path type 108 may be selected as the path geometry for that path type with respect to the current instance of the sensor data 102 (e.g., a current frame of image data).

As such, in an example where there are four path types 108 computed by the machine learning model(s) 104, and eight anchor points, there may be four confidence values corresponding to the likelihood that the path geometry 106 for each of the anchor points corresponds to each of the path types 108. Out of the eight anchor points, a first anchor point may have a highest confidence value for a first path type (e.g., an ego-path), a second anchor point may have a highest confidence value for a second path type (e.g., left adjacent ego-path), a third anchor point may have a highest confidence value for a third path type (e.g., right adjacent ego-path), and a fourth anchor point may have a highest confidence value for a fourth path type (e.g., two paths left of ego-path). In such an example, an ArgMax function may be used to determine that the path geometry 106 corresponding to the first anchor point should be used as the ego-path geometry, that the path geometry 106 corresponding to the second anchor point should be used as the left adjacent ego-path, and so on. Any of the path geometries 106 corresponding to anchor points that do not have a highest confidence value associated with them may not be used by the path detection system (e.g., may be ignored).

In some embodiments, path assignment 112 may be executed using non-maximum suppression. Non-maximum suppression may be used where two or more path geometries 106 have associated confidence values (e.g., corresponding to the path type(s) 108) that indicate the path geometries 106 may correspond to the same path type 108. In such examples, the confidence value that is the highest for the particular path type may be used to determine the path geometry for the path type, and non-maximum suppression may be used to remove, or suppress, the other geometries. To determine which paths to suppress, a calculation may be made of the sum distance between paths of the same path type, where the sum distance may be calculated by summing the distances between a number of points along the different paths (e.g., along a selected path and along each other path of one or more other paths). The points may be selected at the same number of arc lengths along the paths, and a distance may be calculated between points on the selected path and points on the other paths. Where the sum distances are low enough (e.g., within a threshold sum distance), the path may be determined to be duplicative, and the path(s) may be suppressed. As a result, only one path geometry 106 may remain for each path type 108.

In other embodiments, path assignment 112 may be executed using a density-based spatial clustering of applications with noise (DBSCAN) approach. In some embodiments, the DBSCAN approach may be executed similarly to the description within U.S. Non-Provisional patent application Ser. No. 16/277,895, filed on Feb. 15, 2019, and hereby incorporated by reference in its entirety.

Once the path geometries 106 are determined for each of the path types 108, an offset to image coordinates 114 may be calculated to compute the path geometry in image coordinates (e.g., two-dimensional (2D) pixel locations). For example, in embodiments where the path geometry(ies) 106 are delta values corresponding to known pixel locations of anchor points, a computation may be executed to determine the pixel locations of the vertices of the paths using the pixel locations of the anchor points and the delta values. In addition, the pixel locations for the vertices of the path(s) may be scaled to the size of the image used as the input to the machine learning model(s) 104. In some non-limiting examples, the offset to image coordinates 114 may be calculated using equation (2), below:

$$\text{path\_vertex} = (\text{delta\_values} + \text{anchor\_location}) * \text{scale\_to\_image} \quad (2)$$

where path_vertex is a location of a vertex of a path, delta_values are the delta x and/or delta y values for the vertex of the path, anchor_location is the pixel location of the anchor point that the delta values were computed relative to, and scale_to_image is the scale conversion for converting the values to the spatial resolution of the image used as input to the machine learning model(s) 104. This calculation may be executed for each of the vertices of each of the paths.

Once the locations of the vertices of the path(s) are determined in 2D image space, 2D to three-dimensional (3D) conversion 116 may be executed to determine the locations of the vertices and/or the path(s) in world space (e.g., within the physical environment of the vehicle 1100).

The predicted boundary point locations may represent pixel locations within an image represented by the sensor data. The pixel locations may be two-dimensional (2D) coordinates in the image (e.g., a column and a row). In order to accurately determine the relationship between the 2D coordinates and the 3D world coordinates, 3D to 2D projection may be used. For example, a camera or other sensor(s) may be calibrated (e.g., using sensor calibration 118) using one or more intrinsic (e.g., focal length, f, optical center ($u_o$, $v_o$), pixel aspect ratio, a, skew, s, etc.) and/or extrinsic (e.g., 3D rotation, R, translation, t, etc.) camera parameters. One or more constraints may also be imposed, such as requiring that the 3D point always lies on the ground plane of the driving surface. In some examples, one or more of the parameters of the camera may be dynamic (e.g., due to vibration, movement, orientation, etc.), and the 3D to 2D projection may be dynamically updated as a result. In some examples, such as where two or more cameras are used, stereo vision techniques may be used to determine a correlation between 2D points and 3D world locations. In any example, the 3D world coordinates may then be mapped to the 2D coordinates of the pixels in the image space, such that when the vertex locations, or the path locations, are determined, the 3D world coordinates are known and may be used by the autonomous driving software stack 122 (or more generally, by the autonomous vehicle 1100).

In some embodiments (as indicated by the dashed lines), an edge to rail calculation 120 may be executed. For example, where the path geometry(ies) 108 correspond to the edges of the paths (and/or the sides of polygons), the edge to rail calculation 120 may be used to determine a rail extending along the center of the path(s). The rail may be used for determining a trajectory of the vehicle 1100, for determining a center of the path for lane-keeping purposes, and/or for other uses. In some examples, however, the rail may not be calculated, and the edges, or sides of a polygon, may be used. In other examples, both the edges and the rail may be calculated and/or used for one or more of the paths.

The path geometry(ies) 106 (e.g., after 2D to 3D conversion 116 and/or edge to rail calculation 120) may be used to calculate one or more key performance indicators (KPIs) 124 (described in more detail herein at least with respect to FIGS. 10A-10E) and/or may be used by control component(s) of the autonomous vehicle 1100, such as an autonomous driving software stack 122 executing on one or more components of the vehicle 1100 (e.g., the SoC(s) 1104, the CPU(s) 1118, the GPU(s) 1120, etc.). For example, the rail and/or edges as defined by the path geometry(ies) 106 may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle or collision avoidance layer of the drive stack 122), actuation component(s) 134 (e.g., corresponding to an actuation layer of the drive stack 122), and/or other components corresponding to additional and/or alternative layers of the drive stack 122. The process 100 may, in some examples, be executed by the perception component(s), which may feed up the layers of the drive stack 122 to the world model manager, as described in more detail herein.

The sensor manager may manage and/or abstract the sensor data 102 from the sensors of the vehicle 1100. For example, and with reference to FIG. 11C, the sensor data 102 may be generated (e.g., perpetually, at intervals, based on certain conditions) by global navigation satellite system (GNSS) sensor(s) 1158, RADAR sensor(s) 1160, ultrasonic sensor(s) 1162, LIDAR sensor(s) 1164, inertial measurement unit (IMU) sensor(s) 1166, microphone(s) 1196, stereo camera(s) 1168, wide-view camera(s) 1170, infrared camera(s) 1172, surround camera(s) 1174, long range and/or mid-range camera(s) 1198, and/or other sensor types.

The sensor manager may receive the sensor data 102 from the sensors in different formats (e.g., sensors of the same type, such as image sensors of cameras, may output sensor data in different formats), and may be configured to convert the different formats to a uniform format (e.g., for each sensor of the same type). As a result, other components, features, and/or functionality of the autonomous vehicle 1100 may use the uniform format, thereby simplifying processing of the sensor data 102. In some examples, the sensor manager may use a uniform format to apply control back to the sensors of the vehicle 1100, such as to set frame rates or to perform gain control. The sensor manager may also update sensor packets or communications corresponding to the sensor data with timestamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122 (e.g., the locations of the rails or edges of drivable paths based on the path geometry(ies) 106, the path type(s) 108, etc.). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1100 is allowed to drive or is capable of driving (e.g., based on the location of the drivable paths defined by the path geometry(ies) 106), and how fast the vehicle 1100 can drive without colliding with an obstacle (e.g., an object, such as a structure, entity, vehicle, etc.) that is sensed by the sensors of the vehicle 1100.

The path perceiver may perform path perception, such as by perceiving nominal paths that are available in a particular situation. In some examples, the path perceiver may further take into account lane changes for path perception. A lane graph may represent the path or paths available to the vehicle 1100, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 1100 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1100 of static or stationary infrastructure objects and obstacles. The map perceiver may also generate information for the wait perceiver and/or the path perceiver, for example, such as to determine which light at an intersection has to be green for the vehicle 1100 to take a particular path.

Figure 11A:
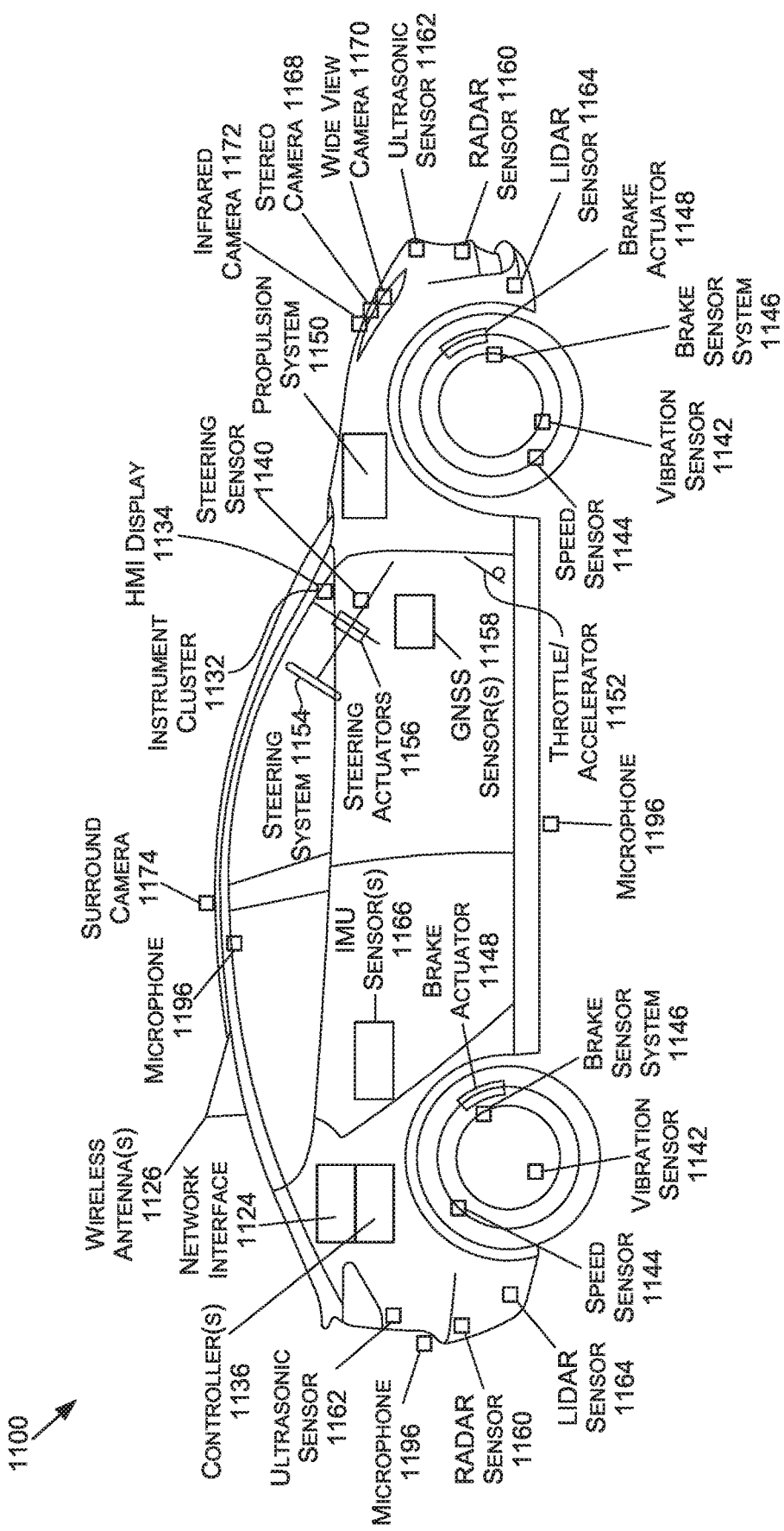
FIG. 11A is an illustration of an example autonomous vehicle, in accordance with some embodiments of the present disclosure.
Figure 11B:
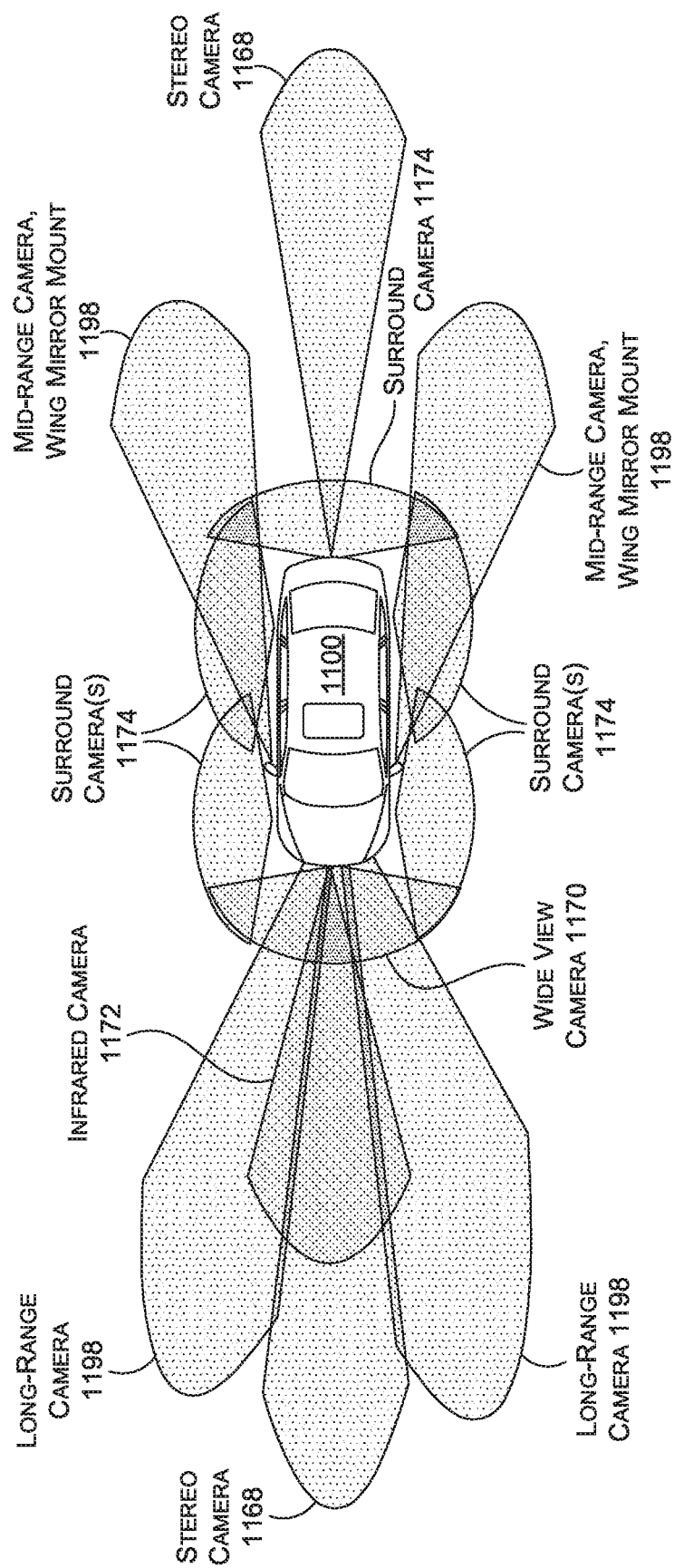
FIG. 11B is an example of camera locations and fields of view for the example autonomous vehicle of FIG. 11A, in accordance with some embodiments of the present disclosure.
Figure 11C:
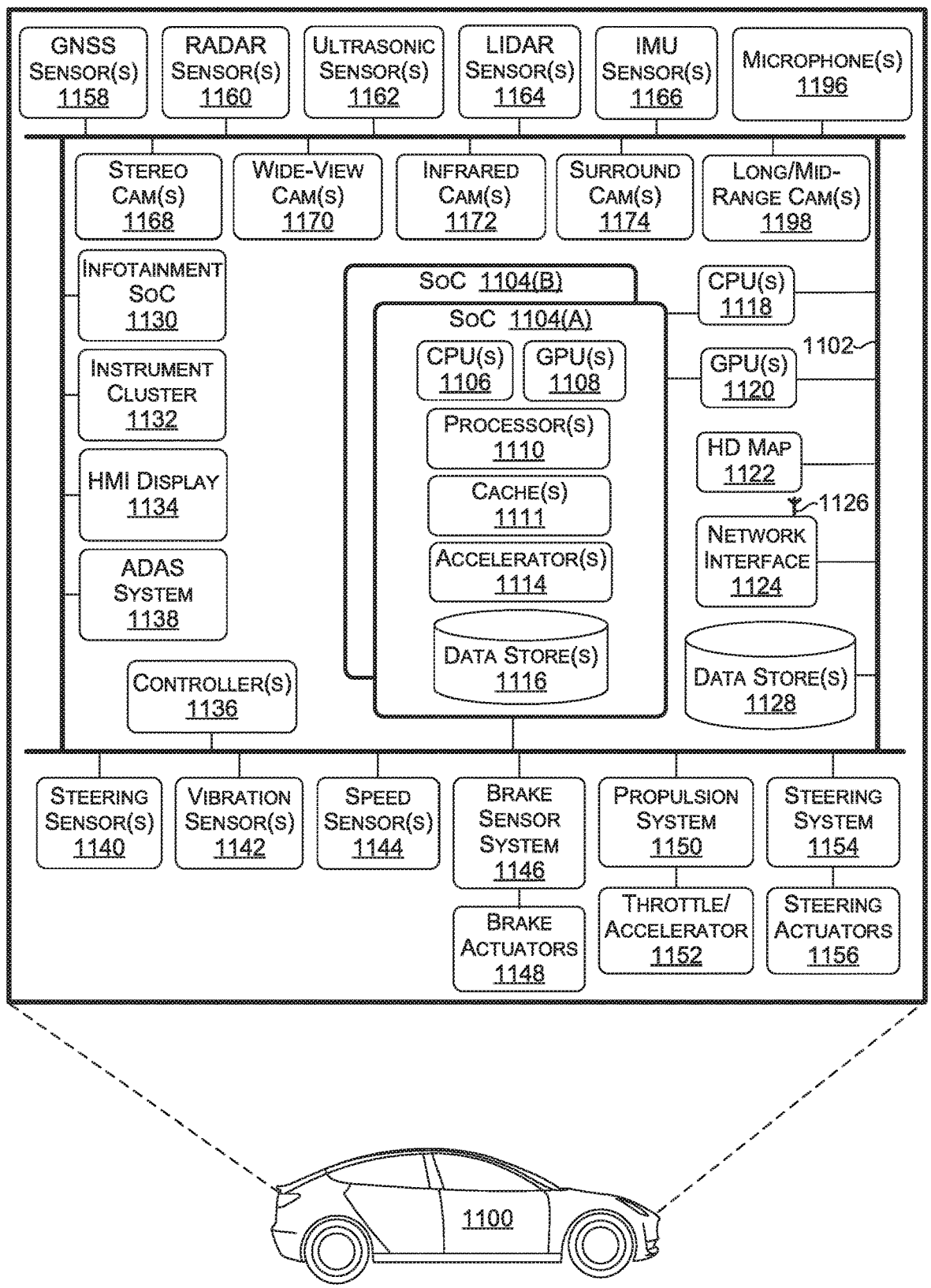
FIG. 11C is a block diagram of an example system architecture for the example autonomous vehicle of FIG. 11A, in accordance with some embodiments of the present disclosure.
Figure 11D:
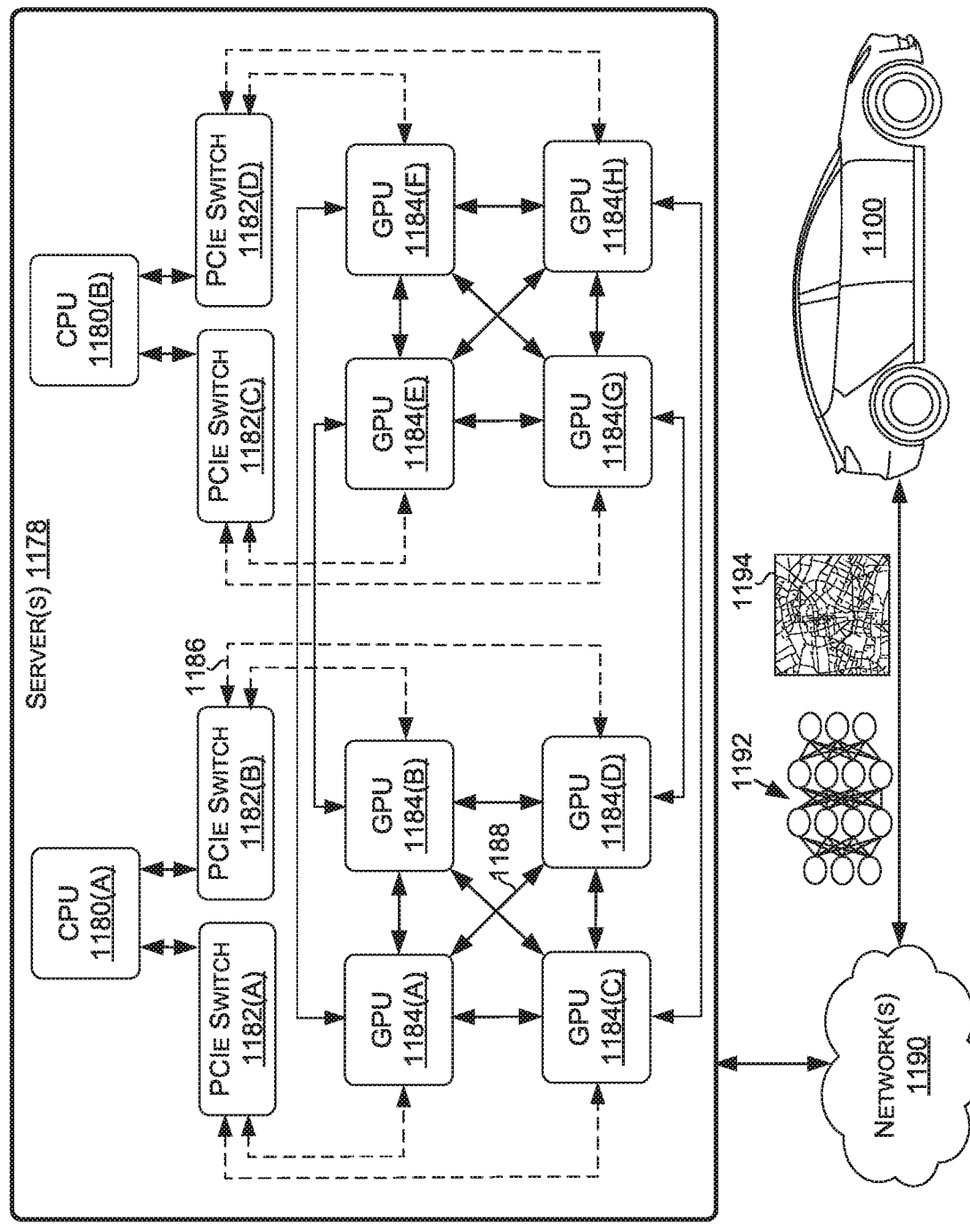
FIG. 11D is a system diagram for communication between cloud-based server(s) and the example autonomous vehicle of FIG. 11A, in accordance with some embodiments of the present disclosure.

In some examples, information from the map perceiver may be sent, transmitted, and/or provided to server(s) (e.g., to a map manager of server(s) 1178 of FIG. 11D), and information from the server(s) may be sent, transmitted, and/or provided to the map perceiver and/or a localization manager of the vehicle 1100. The map manager may include a cloud mapping application that is remotely located from the vehicle 1100 and accessible by the vehicle 1100 over one or more network(s). For example, the map perceiver and/or the localization manager of the vehicle 1100 may communicate with the map manager and/or one or more other components or features of the server(s) to inform the map perceiver and/or the localization manager of past and present drives or trips of the vehicle 1100, as well as past and present drives or trips of other vehicles. The map manager may provide mapping outputs (e.g., map data) that may be localized by the localization manager based on a particular location of the vehicle 1100, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1100, etc. The waypoints may be representative of a specific distance into the future for the vehicle 1100, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1100, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector (e.g., based on the path geometry(ies) 106 and/or the class labels) of the planning component(s) 128 as closely as possible and within the capabilities of the vehicle 1100. The control component(s) 130 may use tight feedback to handle unplanned events or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold true for any of the separately illustrated components of the drive stack 122.

The obstacle avoidance component(s) 132 may aid the autonomous vehicle 1100 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1100. In some examples, the obstacle avoidance component(s) 132 may be used independently of components, features, and/or functionality of the vehicle 1100 that is required to obey traffic rules and drive courteously. In such examples, the obstacle avoidance component(s) may ignore traffic laws, rules of the road, and courteous driving norms in order to ensure that collisions do not occur between the vehicle 1100 and any objects. As such, the obstacle avoidance layer may be a separate layer from the rules of the road layer, and the obstacle avoidance layer may ensure that the vehicle 1100 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable paths as defined by the path geometries 106 and/or the path type(s) 108 corresponding to each of the path geometries 106 may be used by the obstacle avoidance component(s) 132 in determining controls or actions to take. For example, the drivable paths may provide an indication to the obstacle avoidance component(s) 132 of where the vehicle 1100 may maneuver without striking any objects, structures, and/or the like, or at least where no static structures may exist.

In non-limiting embodiments, the obstacle avoidance component(s) 132 may be implemented as a separate, discrete feature of the vehicle 1100. For example, the obstacle avoidance component(s) 132 may operate separately (e.g., in parallel with, prior to, and/or after) the planning layer, the control layer, the actuation layer, and/or other layers of the drive stack 122.

Now referring to FIG. 1B, FIG. 1B is another data flow diagram illustrating an example process 136 for a path detection system, in accordance with some embodiments of the present disclosure. The process 136 may represent an iteration of the process 100 of FIG. 1A in an illustrative or visual form (e.g., including visual representations of one or more aspects of the process 100). The process 136 may include inputting sensor data 102A (e.g., image data representative of an image) to a machine learning model 104 (e.g., a DNN, such as a CNN). The machine learning model 104 may generate path geometries 106 (e.g., path geometries 106A-106F) as well as confidence values 138 (e.g., confidence values 138A-138F corresponding to path geometries 106A-106F, respectively) for each of the path types 108 (e.g., for three path types 108, $C_{-1}$, $C_0$, and $C_{+1}$. As a non-limiting example, $C_{-1}$ may correspond to a path left of an ego-path, $C_0$ may correspond to the ego-path, and $C_{+1}$ may correspond to a path right of the ego-path. As such, the confidence values 138 may correspond to a likelihood or a confidence that the path geometries 106 correspond to each of the path types 108—$C_{-1}$, and $C_{+1}$.

The path geometries 106 may be representations of the geometries as determined using the delta values computed by the machine learning model 104. For example, each of the path geometries 106 may correspond to an anchor point having a known location (e.g., in 2D pixel coordinates), and the delta values (e.g., pixel distances from the anchor point location) for each of the vertices of the paths may be used to determine the location of each of the vertices of the path and thus the geometry of the path.

In the example of the process 136, an ArgMax, or winner-take-all approach may be implemented for path assignment 112 and, as a result, the path geometry 106B may be selected as the path for the left of ego-path, $C_{-1}$. This may be a result of the confidence value being 0.8, which is greater than each other confidence value for $C_{-1}$ for each other path geometry 106 (e.g., the other confidence values for $C_{-1}$ are 0.5, 0.1, 0.1, 0.1, 0.1). Similarly, the path geometry 106C may be selected as the path for the ego-path, $C_0$, and the path geometry 106F may be selected as the right of ego-path, $C_{+1}$. Once each of the path types 108 has an assigned path geometry 106, the path geometries 106 may be used by the autonomous vehicle 1100 to perform one or more operations and/or to calculate one or more KPIs 124. Visualization 140 includes the path geometries 106B, 106C, and 106F overlaid on the image (e.g., represented by the sensor data 102A), where the path geometry 106C is in the center (as the ego-path), the path geometry 106B is to the left (as the left of ego-path), and the path geometry 106F is to the right (as the right of ego-path). As such, the vehicle 1100 may use this information (e.g., as the edges, or rails of the paths) to navigate, plan, or otherwise perform one or more operations (e.g. lane keeping, lane changing, merging, splitting, etc.) within the environment.

Although only three path types 108 (e.g., $C_{-1}$, $C_0$, and $C_{+1}$) are represented in FIG. 1B, this is not intended to be limiting. For example, the machine learning model 104 may be trained to predict any number of path types 108 without departing from the scope of the present disclosure.

Now referring to FIG. 1C, FIG. 1C is an illustration of an example machine learning model 104A, in accordance with some embodiments of the present disclosure. The machine learning model 104A may be one example of a machine learning model 104 that may be used in the process 100 of FIG. 1A and/or the process 136 of FIG. 1B. The machine learning model 104A may include or be referred to as a convolutional neural network and thus may alternatively be referred to herein as convolutional neural network 104A, convolutional network 104A, or CNN 104A.

As described herein, the machine learning model 104A may use the sensor data 102B (with or without pre-processing) (illustrated as an image in FIG. 1C) as an input. The sensor data 102 may represent images (e.g., the sensor data 102 may be image data) generated by one or more cameras (e.g., one or more of the cameras described herein with respect to FIGS. 11A-11C). For example, the sensor data 102 may include image data representative of a field of view of the camera(s). More specifically, the sensor data 102 may include individual images generated by the camera(s), where image data representative of one or more of the individual images may be input into the convolutional network 104A at each iteration of the convolutional network 104A. The sensor data 102 may be input as a single image, or may be input using batching, such as mini-batching. For example, two or more images may be used as inputs together (e.g., at the same time). The two or more images may be from two or more sensors (e.g., two or more cameras) that captured the images at the same time.

The sensor data 102 may be input into a feature extractor layer(s) 142 of the convolutional network 104A (e.g., feature extractor layer 142A). The feature extractor layer(s) 142 may include any number of layers 142, such as the layers 142A-142C. One or more of the layers 142 may include an input layer. The input layer may hold values associated with the sensor data 102. For example, when the sensor data 102 is an image(s), the input layer may hold values representative of the raw pixel values of the image(s) as a volume (e.g., a width, W, a height, H, and color channels, C (e.g., RGB), such as 32×32×3), and/or a batch size, B (e.g., where batching is used)

One or more layers 142 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32×32×12, if 12 were the number of filters).

One or more of the layers 142 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 142 may include a pooling layer. The pooling layer may perform a down-sampling operation along the spatial dimensions (e.g., the height and the width), which may result in a smaller volume than the input of the pooling layer (e.g., 16×16×12 from the 32×32×12 input volume). In some examples, the convolutional network 104A may not include any pooling layers. In such examples, strided convolution layers may be used in place of pooling layers. In some examples, the feature extractor layer(s) 142 may include alternating convolutional layers and pooling layers.

One or more of the layers 142 may include a fully connected layer. Each neuron in the fully connected layer(s) may be connected to each of the neurons in the previous volume. The fully connected layer may compute class scores, and the resulting volume may be 1×1×number of classes. In some examples, the feature extractor layer(s) 142 may include a fully connected layer, while in other examples, the fully connected layer of the convolutional network 104A may be the fully connected layer separate from the feature extractor layer(s) 142. In some examples, no fully connected layers may be used by the feature extractor 142 and/or the machine learning model 104A as a whole, in an effort to increase processing times and reduce computing resource requirements. In such examples, where no fully connected layers are used, the machine learning model 104A may be referred to as a fully convolutional network.

One or more of the layers 142 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images (e.g., the sensor data 102) to the convolutional network 104A, or used to up-sample to the input spatial resolution of a next layer.

Although input layers, convolutional layers, pooling layers, ReLU layers, deconvolutional layers, and fully connected layers are discussed herein with respect to the feature extractor layer(s) 142, this is not intended to be limiting. For example, additional or alternative layers 142 may be used in the feature extractor layer(s) 142, such as normalization layers, SoftMax layers, and/or other layer types.

The output of the feature extractor layer(s) 142 may be an input to path geometry layer(s) 144 and/or path type layer(s) 146. The path geometry layer(s) 144 and/or the path type layer(s) 146 may use one or more of the layer types described herein with respect to the feature extractor layer(s) 142. As described herein, the path geometry layer(s) 144 and/or the path type layer(s) 146 may not include any fully connected layers, in some examples, to reduce processing speeds and decrease computing resource requirements. In such examples, the path geometry layer(s) 144 and/or the path type layer(s) 146 may be referred to as fully convolutional layers.

Different orders and numbers of the layers 142, 144, and 146 of the convolutional network 104A may be used, depending on the embodiment. For example, where two or more cameras or other sensor types are used to generate inputs, there may be a different order and number of layers 142, 144, and 146 for one or more of the sensors. As another example, different ordering and numbering of layers may be used depending on the type of sensor used to generate the sensor data 102, or the type of the sensor data 102 (e.g., RGB, YUV, etc.). In other words, the order and number of layers 142, 144, and 146 of the convolutional network 104A is not limited to any one architecture.

In addition, some of the layers 142, 144, and/or 146 may include parameters (e.g., weights and/or biases)—such as the feature extractor layer(s) 142, the path geometry layer(s) 144, and/or the path type layer(s) 146—while others may not, such as the ReLU layers and pooling layers, for example. In some examples, the parameters may be learned by the machine learning model(s) 104A during training. Further, some of the layers 142, 144, and/or 146 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

In any example, the output of the machine learning model 104A may be the path geometry(ies) 106 and/or the path type(s) 108. In some examples, the path geometry layer(s) 144 may output the path geometry(ies) 106 and the path type layer(s) 146 may output the path type(s) 108. As such, the feature extractor layer(s) 142 may be referred to as a first convolutional stream, the path geometry layer(s) 144 may be referred to as a second convolutional stream, and/or the path type layer(s) 146 may be referred to as a third convolutional stream.

Figure 1D:
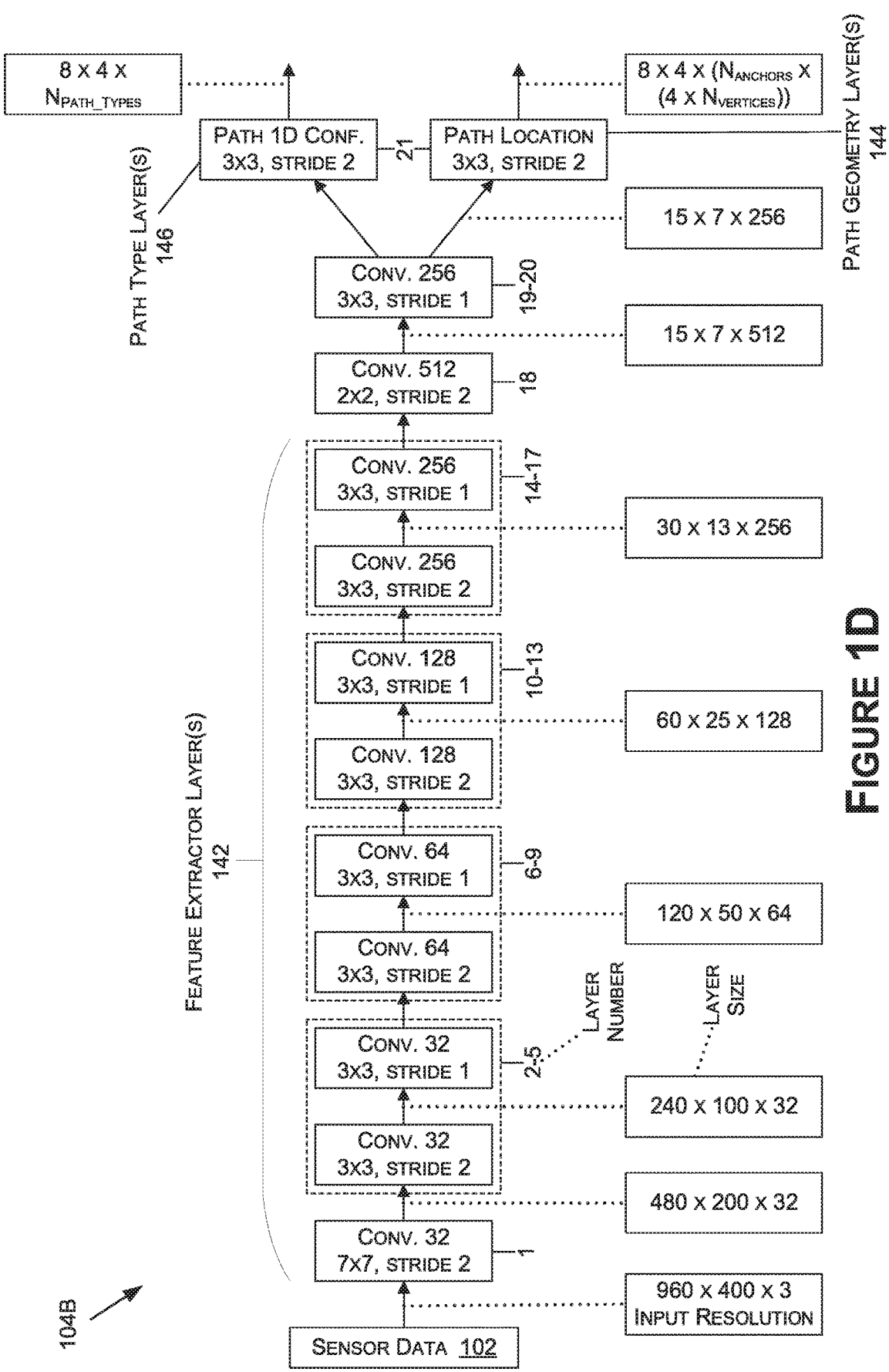

Now referring to FIG. 1D, FIG. 1D is an illustration of another example machine learning model 104B, in accordance with some embodiments of the present disclosure. The machine learning model 104B may be a non-limiting example of the machine learning model(s) 104 for use in the process 100 of FIG. 1A and/or the process 136 of FIG. 1B. The machine learning model 104B may be a convolutional neural network and thus may be referred to herein as convolutional neural network 104B, convolutional network 104B, or CNN 104B. In some examples, the convolutional network 104B may include any number and type of different layers, although some examples do not include any fully connected layers in order to increase processing speeds and reduce computing requirements to enable the process 100 and/or the process 136 to run in real-time (e.g., at 30 fps or greater).

The convolutional network 104B may include feature extractor layer(s) 142, path geometry layer(s) 144, and/or path type layer(s) 146, which may correspond to the feature extractor layer(s) 142, the path geometry layer(s) 144, and/or the path type layer(s) 146 of FIG. 1C, respectively, in some examples. The feature extractor layer(s) 142 may include any number of layers, however, in some examples, the feature extractor layers 142 include eighteen or less layers in order to minimize data storage requirements and to increase processing speeds for the convolutional network 104B. In some examples, the feature extractor layer(s) 142 includes convolutional layers that use 3×3 convolutions for each of its layers, with the exception of the first convolutional layer, in some examples, which may use a 7×7 convolutional kernel. In addition, in some example, the feature extractor layer(s) 142 may not include any skip-connections, which differs from conventional systems and may increase the processing times and accuracy of the system.

In some examples, the feature extractor layer(s) 142 may be similar to the structure illustrated in FIG. 8, and described in the accompanying text, of U.S. Provisional Patent Application No. 62/631,781, entitled "Method for Accurate Real-Time Object Detection and for Determining Confidence of Object Detection Suitable for Autonomous Vehicles", filed Feb. 18, 2018 (hereinafter the '781 application). However, in some examples, the feature extractor layer(s) 142 of the present disclosure may include a network stride of 32, as compared to 16 in the structure of the '781 application (e.g., the input may be down-sampled by 32 instead of 16). By using 16, rather than 32 as the stride, the convolutional network 104B may be computationally faster while not losing much, if any, accuracy. In addition, in some examples, the feature extractor layer(s) 142 may use an applied pool size of 2×2, rather than 3×3 as disclosed in the '781 application.

The feature extractor layer(s) 142 may continuously down sample the spatial resolution of the input image until the output layers are reached (e.g., down-sampling from a 960×400×3 input spatial resolution to the feature extractor layer(s) 142, to 480×200×32 at the output of the first feature extractor layer, to 240×100×32 at the output of the second feature extractor layer 142, and so on, until the output resolution is to 15×7×512 at the output of the last of the feature extractor layer(s) 142. The feature extractor layer(s) 142 may be trained to generate a hierarchical representation of the input image(s) (or other sensor data representations) received from the sensor data 102 with each layer generating a higher-level extraction than its preceding layer. In other words, the input resolution across the feature extractor layer(s) 142 (and/or any additional or alternative layers) may be decreased, allowing the convolutional network 104B to be capable of processing images faster than conventional systems.

The path geometry layer(s) 144 and/or the path type layer(s) 146 may take the output of the feature extractor layer(s) 142, or the output of one or more additional layers (e.g., the layers 19-20) as input. The path geometry layer(s) 144 may be used to compute the delta values for each of the vertices of a path, and may generate a path for each anchor point, or anchor line. The path type layer(s) 146 may be used to compute confidence values corresponding to a likelihood or confidence that, for each of the paths predicted by the path geometry layer(s) 144, the path corresponds to a path type. Although the path geometry layer(s) 144 and the path type layer(s) 146 are each illustrated as including only a single layer (e.g., layer 21), this is not intended to be limiting. For example, the path geometry layer(s) 144 and the path type layer(s) 146 may include any number or type of layers without departing from the scope of the present disclosure.

In some examples, with reference to FIG. 1D, the output of the machine learning model(s) 104 may include the path geometry(ies) 106 and the path type(s) 108 (e.g., as confidence values). As an example, the output of the path geometry(ies) 106 may have a spatial resolution of 8×4× ($N_{anchors}$×(4×$N_{vertices}$)). $N_{anchors}$ may be the number of anchor points, anchor lines, or a combination thereof that the machine learning model 104 is trained to predict. $N_{vertices}$ may be the number of vertices for each path that the machine learning model(s) 104 is trained to predict (e.g., ten vertices, twelve vertices, twenty vertices, thirty vertices, etc.). In some examples, the number of vertices may correspond to each of the edges of each path (e.g., ten vertices for each edge), may be a combination of the edges for a path (e.g., twenty vertices, ten for each edge), or may be for a number of vertices of a rail of the path (e.g., fifteen vertices along the rail). Although the spatial resolution of the output of the path geometry(ies) 106 is described as being 8×4×($N_{anchors}$×(4× $N_{vertices}$)), this is not intended to be limiting. The output resolution may be different, depending on the embodiment, without departing from the scope of the present disclosure.

As another example, the output of the path type(s) 108 may have a spatial resolution of 8×4×$N_{path\_types}$, where $N_{path\_types}$ corresponds to the number of path types that the machine learning model 104 is trained to predict (e.g., an ego-path, a left of ego-path, a right of ego-path, two left of ego-path, two right of ego-path, each of the paths, six paths, etc.). Although the spatial resolution of the output of the path type(s) 108 (e.g., as confidence values) is described as being 8×4×$N_{path\_types}$, this is not intended to be limiting. The output resolution may be different, depending on the embodiment, without departing from the scope of the present disclosure.

In some examples, although not illustrated in FIG. 1D, the convolutional network 104B may include one or more concatenation layers (e.g., depth concatenation layer(s)) that receive the outputs of the path geometry layer(s) 144 and the path type layer(s) 146, and concatenate them. For example, because the output spatial resolution of the path geometry layer(s) 144 and the path type layer(s) 146 may be the same along two dimensions (e.g., height and width), a depth concatenation layer(s) may be used to concatenate along the depth dimension (e.g., the channel dimension). The concatenated output may be representative of both the path geometry(ies) 106 and the path type(s) 108.

The outputs of the convolutional network 104B (e.g., the path geometry(ies) 106, the path type(s) 108, or a concatenated version thereof) may be used by the vehicle 1100 (e.g., by the drive stack 122 and/or control component(s)) to aid the vehicle in navigating, mapping, understanding, and/or performing one or more other operations within an environment. In some examples, as described herein, post-processing may be performed on the outputs of the convolutional network 104B (e.g., temporal smoothing 110, path assignment 112, offset to image coordinates 114, 2D to 3D conversion 116, edge to rail calculation 120, etc.) prior to use by the drive stack 122 and/or other components of the vehicle 1100.

Figure 2A:
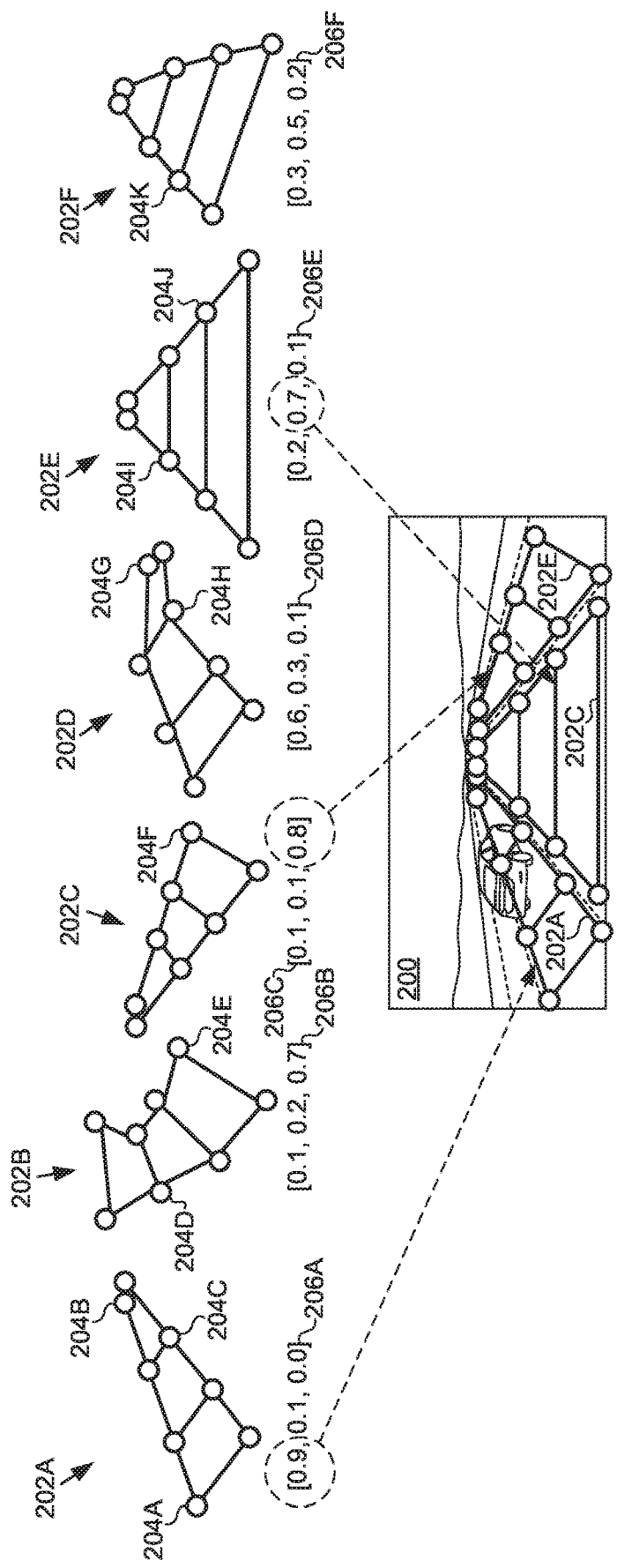
FIG. 2A is an illustration of an example output of a machine learning model, in accordance with some embodiments of the present disclosure.

Now referring to FIG. 2A, FIG. 2A is an illustration of an example output of a machine learning model, in accordance with some embodiments of the present disclosure. For example, the machine learning model(s) 104 may output path geometries 202 (e.g., path geometries 202A-202F) corresponding to each of the anchor points, or anchor lines, that the machine learning model(s) 104 is trained to predict the path geometries 202 for. The path geometries 202 may be output by the machine learning model(s) 104 as delta values (e.g., delta x, delta y) in 2D image space that correspond to pixel locations of vertices 204 (e.g., vertices 204A-204K) relative to a pixel location of a corresponding anchor point. As such, for the path geometry 202A, the delta values for the vertex 204A may be a delta x and a delta y value, in 2D image space, from a pixel location of the anchor point corresponding to the path geometry 202A. This may be similar for each of the path geometries 202, where the delta values may be predicted relative to a pixel location of a corresponding anchor point (e.g., path geometry 202A corresponds to a first anchor point, anchor line, or anchor points along an anchor line, path geometry 202B corresponds to a second anchor point, anchor line, or anchor points along an anchor line, and so on).

The output of the machine learning model(s) 104 may include path type(s) 206 (e.g., path types 206A-206F) that each correspond to a respective path geometry 202 (e.g., path type 206A may correspond to path geometry 202A, path type 206B may correspond to path geometry 202B, and so on). The path type(s) 206A may include confidence values that represent a likelihood or confidence for each path geometry 202 that the path geometry 202 corresponds to a path type or class (e.g., ego-lane, left of ego-lane, etc.). In some examples, the confidence values of the path type(s) 206 may be used to determine the path geometry 202 that is used for each path type or class. In such examples, the highest confidence value for each path type or class may be used to select the path geometry 202 for that path type or class. As an example, assume that the first confidence value in the path type 206 corresponds to a left ego-path, the middle value corresponds to the ego-path, and the right value corresponds to the right ego-path. In such an example, with respect to the illustration of FIG. 2A, the path geometry 202A may be selected as the left of ego-path geometry based on the confidence value, 0.9, being greater than any other confidence value (e.g., 0.1 for path type 206B, 0.1 for path type 206C, and so on) for the left-ego path. Similarly, the path geometry 202C may be selected as the right ego-path geometry, and the path geometry 202E may be selected as the ego-path. This result may be illustrated in visualization 200, where path geometry 202A, 202C, and 202E are overlaid on an image (e.g., the image used to generate the input data to the machine learning model(s) 104).

With reference to FIG. 2B, FIG. 2B is an illustration of an example rail calculation and an example visualization of drivable paths, in accordance with some embodiments of the present disclosure. The path geometry(ies) 202 may be generated to include delta values for vertices along path edges 210 (e.g., path edges 210A and 210B) of the path geometry(ies) 202. For example, vertex 204L corresponding to path edge 210A and vertex 204M corresponding to path edge 210B may be computed by the machine learning model(s) 104 (e.g., as delta sums from a location of an anchor point, or anchor line). In some examples, only the path edges 210 may be used. However, in other examples, a path rail 212 may be calculated (e.g., at edge to rail calculation 120 of the process 100 of FIG. 1A). The path rail 212 may be calculated based on the vertices 204 along the path edges 210. For example, corresponding vertices (e.g., vertices 204L and 204M) may be averaged to calculate a location of the vertex 214A of the path rail 212. As an illustration, a line 216 may be generated between the vertex 204L and the vertex 204M, and the midway point of the line 216 may be determined to be the location of the vertex 214A.

Although as illustrated the machine learning model(s) 104 compute the vertices 204 of the path edges 210 and then determine the vertices 214 of the path rail 212, this is not intended to be limiting. In some example, the machine learning model(s) 104 may be trained to compute the locations of the vertices 214 of the path rail 212, and the locations of the vertices 214 of the path edges 210 may be calculated using the vertices 214 and a path width. The path width may be determined based on a standard, an estimated standard, or path widths. In other examples, the machine learning model(s) 104 may be trained to identify path width based on ground truth data and observations made from the training data. In any example, once the location of the vertices 214 of the path rail 212 are determined, one-half of the path width can be added in each lateral direction (e.g., to the left and the right) to calculate the locations of the vertices 204 of the path edges 210.

Visualization 208 may include an image overlaid with the path geometry 202 to include the path edges 210 and the path rail 212. The vehicle 1100 may use the path edges 210 and/or the path rail 508 when performing one or more operations (e.g., path planning, mapping, lane-keeping, lane-changing, etc.).

Figure 3:
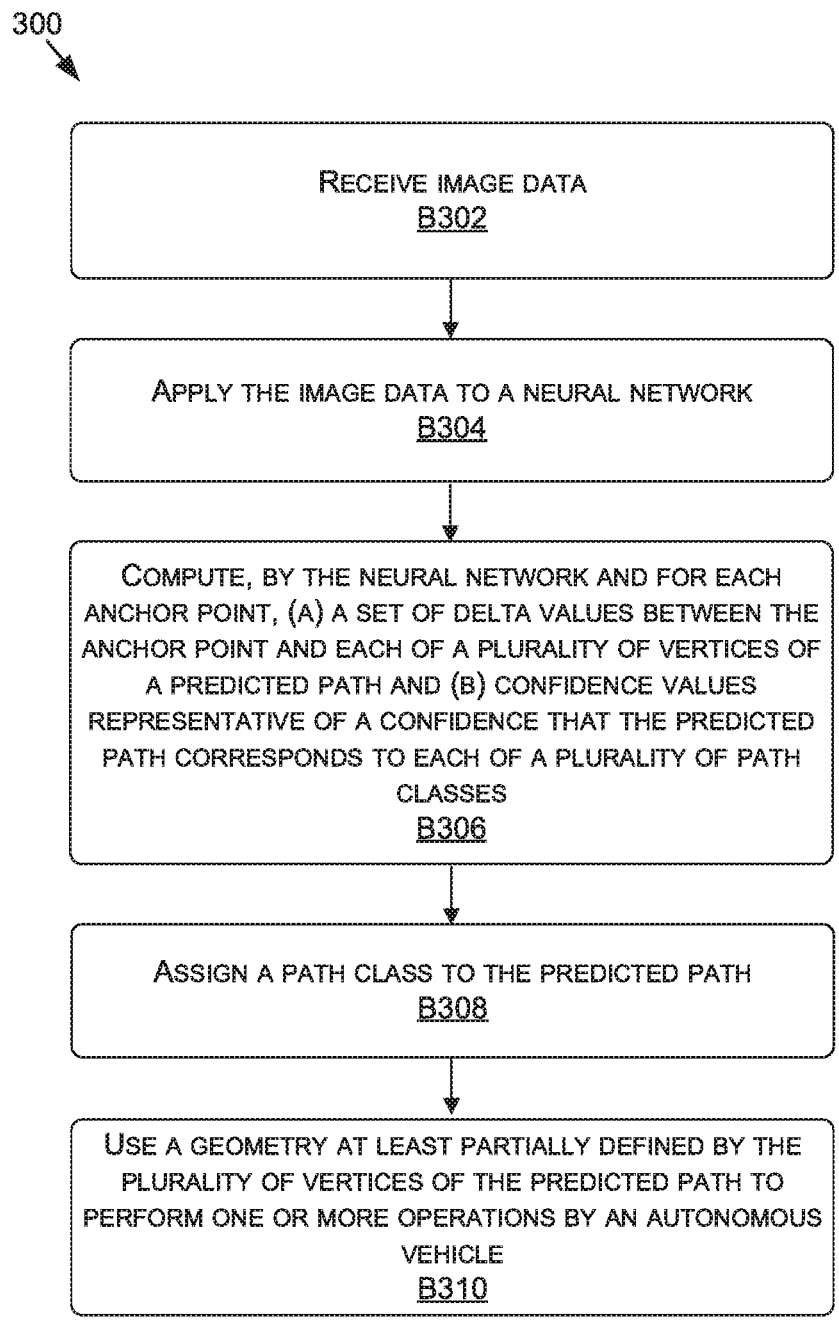
FIG. 3 is a flow diagram showing a method for path detection using anchor points, in accordance with some embodiments of the present disclosure.
Figure 4:
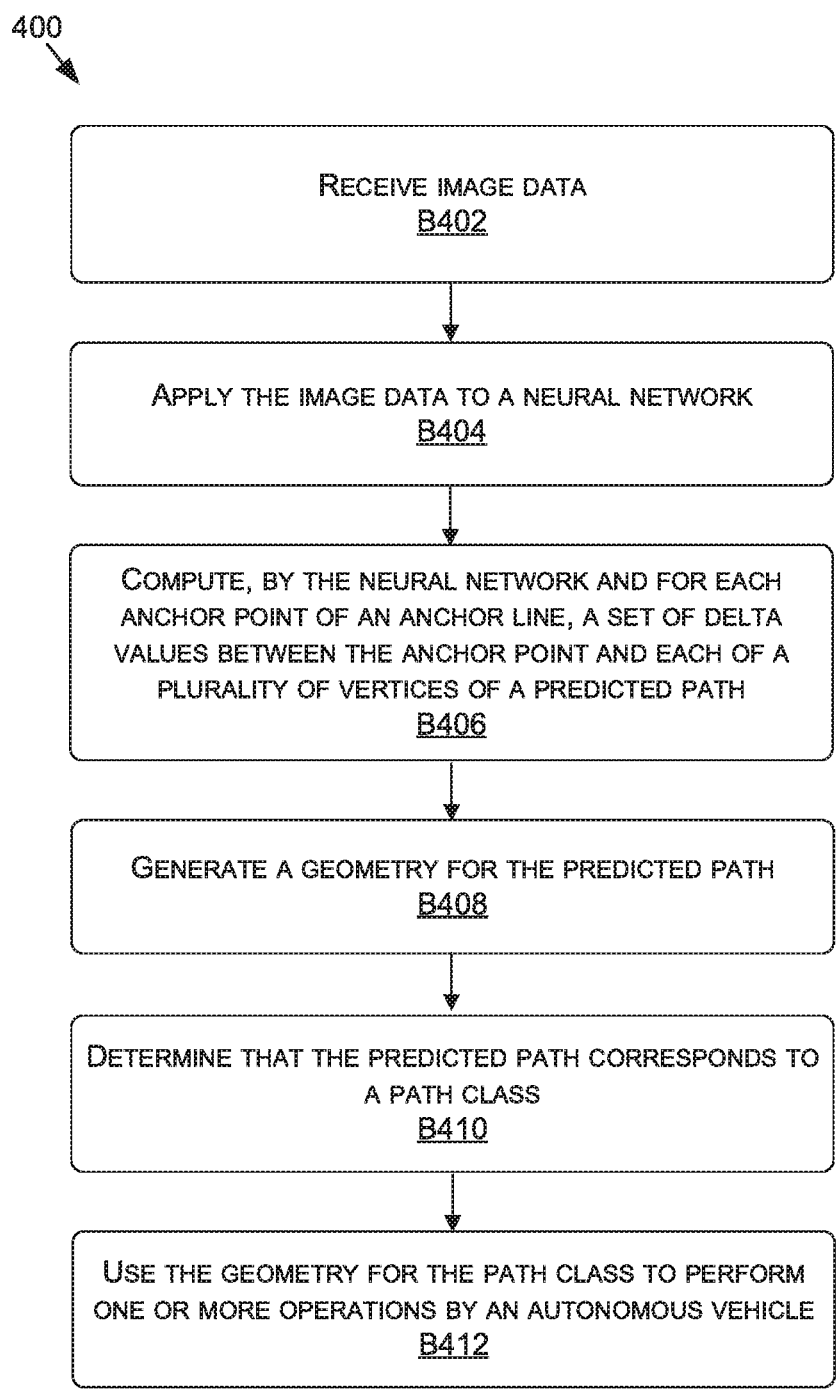
FIG. 4 is a flow diagram showing a method for path detection using anchor lines, in accordance with some embodiments of the present disclosure.

Now referring to FIGS. 3-4, each block of methods 300 and 400, described herein, comprises a computing process that may be performed using any combination of hardware, firmware, and/or software. For instance, various functions may be carried out by a processor executing instructions stored in memory. The methods 300 and 400 may also be embodied as computer-usable instructions stored on computer storage media. The methods 300 and 400 may be provided by a standalone application, a service or hosted service (standalone or in combination with another hosted service), or a plug-in to another product, to name a few. In addition, methods 300 and 400 are described, by way of example, with respect to the process 100 of FIG. 1A. However, these methods 300 and 400 may additionally or alternatively be executed by any one system, or any combination of systems, including, but not limited to, those described herein.

FIG. 3 is a flow diagram showing a method 300 for path detection using anchor points, in accordance with some embodiments of the present disclosure. The method 300, at block B302, includes receiving image data. For example, image data (e.g., the sensor data 102) may be received.

The method 300, at block B304, includes applying the image data to a neural network. For example, the image data may be applied (e.g., as an input) to the machine learning model(s) 104 (e.g., a neural network, such as a CNN).

The method 300, at block B306, includes computing, by the neural network and for each anchor point, (A) a set of delta values between the anchor point and each of a plurality of vertices of a predicted path and (B) confidence values representative of a confidence that the predicted path corresponds to each of a plurality of path classes. For example, the machine learning model(s) 104 may compute the path geometry(ies) 106 and the path type(s) 108, as described herein.

The method 300, at block B308, includes assigning a class to the predicted path. For example, based at least in part on the confidence values (e.g., the path type(s) 108), the predicted path (e.g., the path geometry 106) may be assigned a path type or class.

The method 300, at block B310, includes using a geometry at least partially defined by the plurality of vertices of the predicted path to perform one or more operations by an autonomous vehicle. For example, the path geometry(ies) 106 may be used by the vehicle 1100 to perform one or more operations (e.g., using the drive stack 122 and/or a control component of the vehicle 1100).

FIG. 4 is a flow diagram showing a method 400 for path detection using anchor lines, in accordance with some embodiments of the present disclosure. The method 400, at block B402, includes receiving image data. For example, image data (e.g., the sensor data 102) may be received.

The method 400, at block B404, includes applying the image data to a neural network. For example, the image data may be applied (e.g., as an input) to the machine learning model(s) 104 (e.g., a neural network, such as a CNN).

The method 400, at block B406, includes computing, by the neural network and for each anchor point of an anchor line, a set of delta values between the anchor point and each of a plurality of vertices of a predicted path. For example, a delta sum may be computed for each anchor point of each anchor line.

The method 400, at block B408, includes generating a geometry for the predicted path. For example, the delta sums may be used to generate a path geometry 106 for the predicted path.

The method 400, at block B410, includes determining that the predicted path corresponds to a path class. For example, the confidence values associated with each anchor line (as output with the path type(s) 108) may be used to determine what path class or type the predicted path corresponds.

The method 400, at block B410, includes using the geometry for the path class to perform one or more operations by an autonomous vehicle. For example, the path geometry(ies) 106 may be used by the vehicle 1100 to perform one or more operations (e.g., using the drive stack 122 and/or a control component of the vehicle 1100).

Training Machine Learning Model(s) of a Path Detection System

In order to train the DNN of the present disclosure, ground truth data including a combination of anchor points, or anchor lines, and annotated paths may be used. For example, any number of anchor points, or anchor lines, may be associated with each image in a training set of images. Anchor points may be situated in any orientation with respect to the images. For example, there may be a single anchor point at the center of the image, or otherwise located with respect to the image, or there may be a plurality of anchor points, such as a grid of anchor points (e.g., a 4×3 grid, a 2×4 grid, a 6×3 grid, etc.). In other examples, instead of using anchor points, anchor lines may be used which each may include a plurality of anchor points. The anchor lines may be linear, cubic polynomial, another shape, and/or a combination thereof. Annotated paths may be labeled (e.g., manually, automatically, etc.) with respect to each of the images of the training set of images.

In some non-limiting examples, the annotated paths may indicate edges of the drivable paths in the images, or may indicate a centerline of the drivable paths in the images. The number of annotated paths may correspond to a training parameter of the DNN, for determining how many predicted paths to output by the DNN. For example, a drivable path for the ego-vehicle (e.g., the vehicle capturing the image data) and one or more adjacent and/or other paths may be annotated (e.g., lanes to the left and right of the ego-vehicle, two lanes each to the left and right of the ego-vehicle, all lanes in the image, etc.). The annotated paths may include any number of vertices or polyline points (e.g., as a training parameter of the DNN). In addition, the annotated paths may be classified by path type (e.g., ego-lane, right of ego-lane, left of ego-lane, etc.), such that the annotated path includes path type (or class) information.

Once the annotated paths are generated, delta sums may be generated for each path with respect to each anchor point, or each anchor line. For example, for each anchor point, a delta x (e.g., a pixel distance between the anchor point and a vertex in the x direction) and a delta y (e.g., a pixel distance between the anchor point and a vertex in the y direction) may be calculated between the anchor point and each of the vertices of an annotated path. The sum of the delta x values and the delta y values may be referred to as the delta sum. The anchor point with the lowest delta sum for the annotated path may be encoded to the annotated path as part of the ground truth data. For an anchor line, a delta sum may be calculated for each anchor point along the anchor line, and the sum of the delta sums for each anchor point may be the delta sum for the anchor line. The anchor line with the lowest delta sum for the annotated path may be encoded to the annotated path as part of the ground truth data. For each annotated path of each image, this process may be repeated until each of the annotated paths is encoded to an anchor point or an anchor line.

The images of the training set of images may then be input into the DNN and the anchor points, or anchor lines, and the annotated paths (e.g., the delta values for the annotated paths with respect to the respective encoded anchor points) may be used as ground truth data to train the DNN. For example, one or more loss functions (e.g., a single loss function, a loss function for each output type, etc.) may be used to compare the accuracy of the DNN's predicted paths with the annotated paths, as well as the predicted path type corresponding to each predicted path, and the parameters of the DNN may be updated (e.g., using backward passes, backpropagation, forward passed, etc.) until the accuracy reaches an optimal or acceptable level.

Now referring to FIG. 5, FIG. 5 is a data flow diagram illustrating a process 500 for training a machine learning model for path detection, in accordance with some embodiments of the present disclosure. The process 500 may be used for training any of the machine learning model(s) 104, such as but not limited to those described herein. The machine learning model(s) 104 may be trained using the sensor data 102, such as the sensor data 102 described herein. In some examples, when used for training, the sensor data 102 may be referred to as training data. Although the sensor data 102 is primarily discussed with respect to image data representative of image(s), this is not intended to be limiting. In some embodiments, for example, the sensor data 102 may include data from one or more LIDAR sensors, RADAR sensors, SONAR sensors, ultrasonic sensors, IMU sensors, and/or other sensor types (e.g., sensors and/or cameras described with respect to FIGS. 11A-11C).

The sensor data 102 used for training may include original images (e.g., as captured by one or more image sensors), down-sampled images, up-sampled images, cropped or region of interest (ROI) images, otherwise augmented images, and/or a combination thereof. The sensor data 102 may be images captured by one or more sensors (e.g., cameras) of various vehicles (e.g., the vehicle 800), and/or may be images captured from within a virtual environment used for testing and/or generating training images (e.g., a virtual camera of a virtual vehicle within a virtual or simulated environment). In some examples, the sensor data 102 may include images from a data store or repository of training images (e.g., images of driving surfaces). The machine learning model(s) 104 may be trained using the images (and/or other sensor data 102) as well as corresponding ground truth data 504. The ground truth data 504 may include annotations, labels, masks, and/or the like. For example, in some embodiments, the ground truth data 504 may include anchor point(s) 506, anchor line(s) 508, path label(s) 510, and/or path type(s) 512 (e.g., encoded to correspond to one or more of the anchor points 506 and/or anchor lines 508). The ground truth data 504 may be generated within a drawing program (e.g., an annotation program), a computer aided design (CAD) program, a labeling program, another type of program suitable for generating the ground truth data 504, and/or may be hand drawn, in some examples. In any example, the ground truth data 504 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image, there may be corresponding ground truth data 504.

The path label(s) 510 may include annotations, or other label types, corresponding to drivable paths. The path label(s) 510 may be generated for each of the images of the sensor data 102 used for training the machine learning model(s) 104. The number of path labels may correspond to the number of paths that the machine learning model(s) 104 is trained to predict, or to the number of paths in the respective image (e.g., which may be more or less than what the machine learning model(s) 104 is trained to predict). As described herein, the path label(s) 510 may be machine automated, human annotated, and/or otherwise generated. Depending on the embodiment, the path label(s) 510 may correspond to a center of a drivable path (e.g., a rail) and/or may correspond to edges of the drivable path.

FIGS. 6A-6E include illustrations of example annotations for use as ground truth data 504 (e.g., the path label(s) 510) for training a machine learning model(s) 104, in accordance with some embodiments of the present disclosure. FIGS. 6A-6E illustrate a few of the advantages of the present disclosure. For example, by generating the path label(s) 510 for training the machine learning model(s) 104 as described herein, the machine learning model(s) 104 may be trained to predict path geometries 106 of drivable paths even where no explicit lane markings exist and/or where lane markings are occluded. As such, drivable paths may be annotated through intersections, through lane merges or lane splits (e.g., in an overlap region between lanes where lane markings are not present), through vehicles or other objects occluding the lane markings, etc.

Figure 6A:
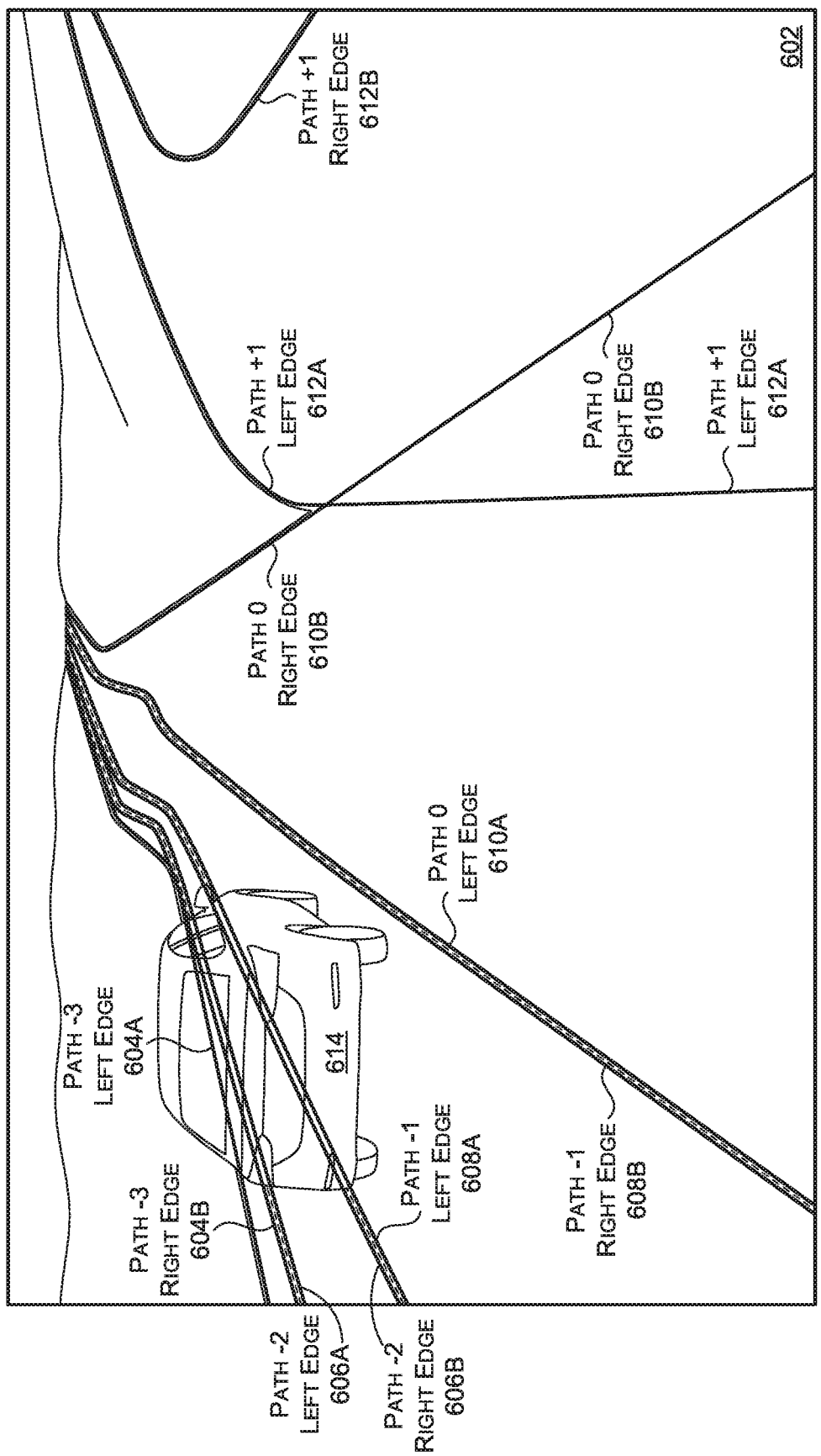
FIGS. 6A-6E include illustrations of example annotations for use as ground truth data for training a machine learning model, in accordance with some embodiments of the present disclosure.

In the example of FIG. 6A, five paths may be annotated as the path label(s) 510—an ego path 610 (e.g., path 0), a right of ego-path 612 (e.g., path +1), a first left of ego-path 608 (e.g., path −1), a second left of ego-path 606 (e.g., path −2), and a third left of ego-path 604 (e.g., path −3). According to non-limiting examples, the machine learning model(s) 104 may be trained to predict five path types, or may be trained to predict seven path types (e.g., ego-path, three to the left of ego-path, and three to the right of ego-path, or may be trained to predict any number of path type(s)). The five paths may correspond to image 602 (e.g., may correspond to pixel locations of the image 602). The path label(s) 510 may include edges of the paths, such that left edge 604A and right edge 604B delineate path 604, left edge 606A and right edge 606B delineate path 606, left edge 608A and right edge 608B delineate the path 608, left edge 610A and right edge 610B delineate path 610, and left edge 612A and right edge 612B delineate path 612.

As illustrated in FIG. 6A, the annotations of the left edge 604A, the right edge 604B, the left edge 606A, the right edge 606B, and the left edge 608A extend along vehicle 614. As such, the machine learning model(s) 104 may be trained to predict drivable paths without relying on the existence of lane markings or road boundary lines (e.g., even where lane marking or road boundary lines are occluded by a vehicle or other object).

Further illustrated in FIG. 6A, the annotations of the right edge 610B and the left edge 612A are included in an area where lane markings are not present (e.g., where the driving surface splits for an exit, or offramp). However, the path label(s) 510 are included to extend beyond where lane markings or road boundaries may exist, such that the machine learning model(s) 104 may be trained to predict paths (e.g., as path geometries 106) that extend continuously in space (e.g., that extend not only along regions where lane markings or road boundaries would conventionally exist). As a result, the drivable paths may be defined along regions of the drivable surface where no visible delineation is present.

With reference to FIGS. 6B-6E, illustrations of example annotations for use as ground truth data 504 are provided. The path labels 510 may be provided with respect to images 616 (e.g., images 616A-616D). With respect to FIG. 6B, path edge 618A of FIG. 6B may extend along a vehicle, or other object, where lane marking—if existent—may be occluded. Path edge 618B may extend along the driving surface to delineate a left edge of a drivable path for a vehicle merging into the roadway from the right. As such, the machine learning model(s) 104A may be trained to predict an entire drivable path for merging into a roadway, which may be helpful for understanding the environment of the vehicle when in path planning, avoiding obstacles, and/or for other operations of the vehicle.

Figure 6C:
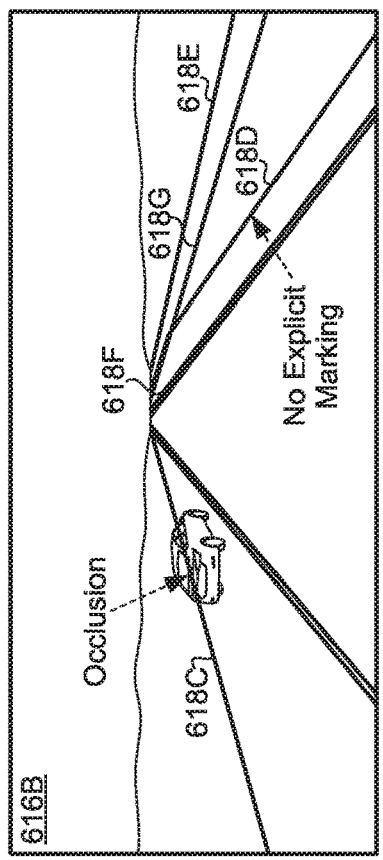
Figure 6E:
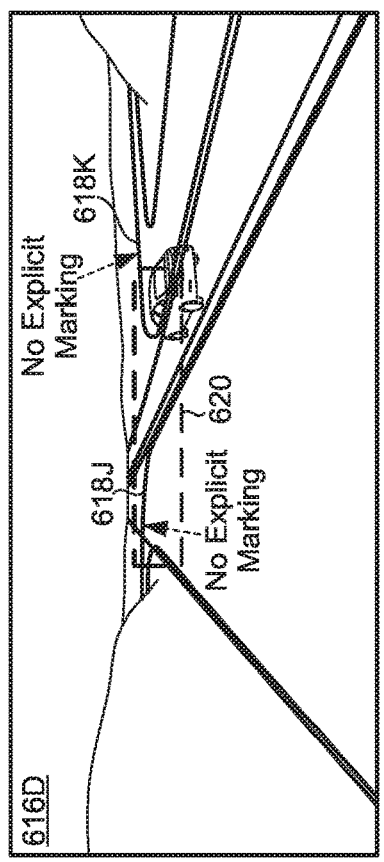
Figure 6B:
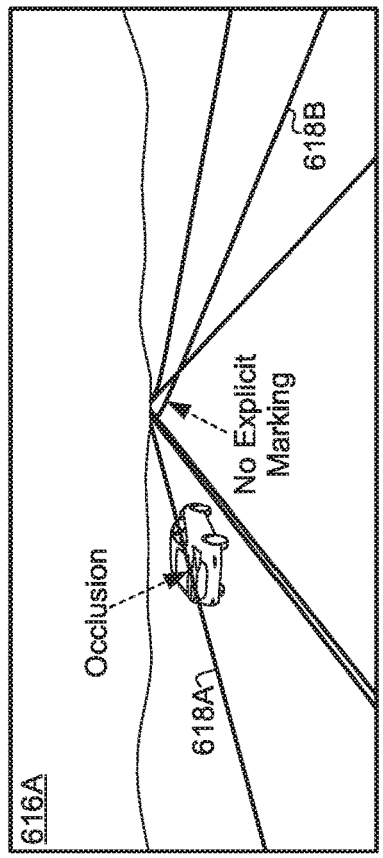

With respect to FIG. 6C, path edge 618C may be similar to that of path edge 618A of FIG. 6B. The image 616B may further represent a scenario where one lane splits into two, and path edges 618D and 618E may correspond to a path toward a right lane of the two lanes in the lane split. As such, path edges 618D and 618E may define a drivable path when moving from a single lane to a right lane of a lane split, while path edges 618F and 618G may define a drivable path when moving from a single lane to a left lane of a lane split.

Figure 6D:
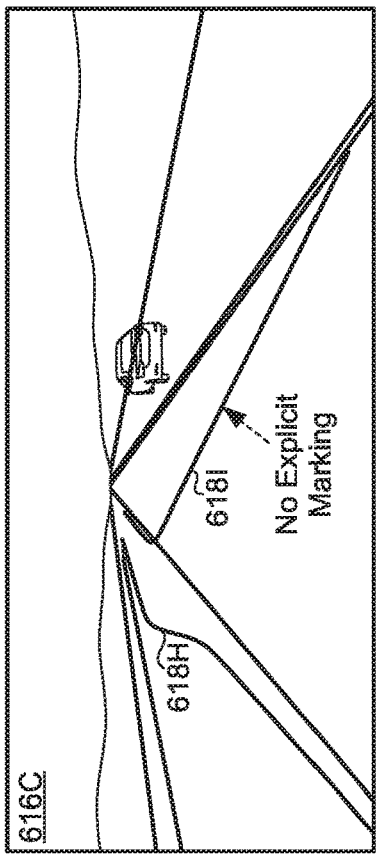

With respect to FIG. 6D, the image 616C may correspond to another scenario where one lane splits into two, and path edge 618H and 618I may correspond to a path toward a left lane of the two lanes in the lane split. As such, path edges 618H and 618I may define a drivable path when moving from a single lane to a left lane of a lane split.

With respect to FIG. 6E, the image 616D may correspond to a scenario where left or right turns may be made through an intersection 620. Path edge 618J may include an annotation for a drivable path along a left turn through the intersection 620, that may include annotations along a portion of the path where lane markings may not be present (e.g., within an intersection). Similarly, path edge 618K may include an annotation for a drivable path along a right turn through the intersection 620 that may include annotations along a portion of the path where lane markings may not be present due to potential confusion where traffic enters from multiple directions. As a result, drivable paths through turns at intersections, as well as straight paths through intersections, may be learned by the machine learning model(s) 104 to aid the vehicle in understanding paths it may take and/or paths other vehicle or objects may take within the environment.

In some examples, the path label(s) 510 may be annotated as complete lines, as illustrated in FIGS. 6A-6E. In other example, the path label(s) 510 may be annotated as points, and the points may be connected automatically to form polylines (e.g., sides of a polygon). As such, the annotations of the path label(s) 510 may be automated, performed by a human annotator, and/or a combination thereof.

Now referring to FIG. 7, FIG. 7 includes an example illustration of encoding anchor points 506 for use as ground truth data 504 for training a machine learning model, in accordance with some embodiments of the present disclosure. Although the description with respect to FIG. 7 is directed toward individual anchor points 506, similar calculations may be performed for anchor lines 508. For example, where a delta sum is calculated for a single anchor point 506, a sum of delta sums for each anchor point 506 of an anchor line 508 may be used similarly to determine an anchor line 508 to encode a path geometry to (e.g., by assigning the anchor line 508 with the lowest sum of delta sums as the encoded anchor line 508).

Each image of the sensor data 102 may include a same orientation of anchor points 506 and/or anchor lines 508. The anchor points 506 and/or anchor lines 508 may have static pixel positions that may only change to a same relative location after augmentation (e.g., up-scaling, down-scaling, cropping, rotating, shifting, etc.) of an image(s). For example, the image 702 may include a 5×3 grid of anchor points 506 located at static pixel locations with respect to the image 702. In the event the image 702, or another image in the set of images used for training the machine learning model(s) 104 is augmented in any way, the static pixel locations of the anchor points 506 may be similarly augmented to correspond to the static pixel location relative to the augmented image.

Although the image 702 includes the 5×3 grid of anchor points 506, this is not intended to be limiting. For example, depending on the embodiment, there may be one anchor point 506 (e.g., centered with respect to the image 702, off-center, etc.), two anchor points 506, three anchor points 506, twenty anchor points 506, anchor points 506 in a grid, anchor points 506 randomly dispersed, anchor points 506 forming shapes, and/or any other number or formation of anchor points 506. Where anchor lines 508 are used, as described in more detail with respect to FIGS. 8A-8E, the anchor lines 508 may each include any number of anchor points 506 located at static pixel positions and forming any types of line shapes—such as linear, quadratic, or a combination thereof. In some examples, similar or identical sets of anchor lines 508 may be positioned at various locations in the images (e.g., a right set, a center set, a left set, an upper set, a lower set, etc.).

To determine which of the anchor points 506 (or anchor lines 508) to encode path labels 510 to, delta sums may be calculated between vertices 710 (e.g., vertex 710A, vertex 710B, vertex 710C, etc.) of the path labels 510 (e.g., delineated by left path edge 708A and right path edge 708B for one of the drivable paths in the image 702) with respect to each anchor point 506. For example, for anchor point 704A, a delta X and a delta Y may be calculated between the anchor point 704A (e.g., having an (x, y) coordinate set to (0, 0)) and each of the vertices 710 of the path edges 708 (e.g., as illustrated in FIG. 7). As such, for vertex 710B, $\Delta X_{12}$ 712A and $\Delta Y_{12}$ 714A may be calculated. Similarly, for vertex 712C, $\Delta X_{13}$ 712B and $\Delta Y_{13}$ may be calculated, and so on, until each of the delta X and delta Y values have been calculated for each vertex. The l and r may correspond to the left path edge and the right path edge, and the number (e.g., 2, 3, etc.) may correspond to the vertex number. The delta X and delta Y values for each of the vertices 710 may then be summed to generate a delta sum that corresponds to the anchor point 704A. This process may be done for each of the path labels 510 for each of the anchor points 506. As such, for each path label 510, each anchor point 506 will have an associated delta sum. In some examples, the anchor point 506 with the lowest value for the delta sum for a particular path label 510 (e.g., path label 708) may be encoded as the anchor point 506 for that particular path label 510.

Although described as using a delta X and a delta Y for each vertex to calculate the delta sum, this is not intended to be limiting. For example, a magnitude of the delta X and delta Y may be used, just delta X, or just delta Y may be used, or another measure of differences between the pixel locations of the vertices and the pixel locations of the anchor points 506 may be used without departing from the scope of the present disclosure.

In the illustration of FIG. 7, the anchor point 704A may have a lower delta sum for the path label 708 than the anchor point 706A, for example, and thus the anchor point 704A may be assigned (or encoded to) the path label 708. Each path label 510 may be encoded to at least one anchor point, and each anchor point 506 that has an encoded path label 510 may be referred to as an assigned anchor point 704 (or an encoded anchor point 704) and each anchor point 506 without an assigned path label 510 may be referred to as an unassigned anchor point 706. In some embodiments, the path labels 510 may include the path rails rather than the path edges. In such examples, the delta values may correspond only to the rail (e.g., a single line), and thus the number of vertices may be reduced.

The assigned anchor points 704 may be used as the ground truth data 504 associated with the path labels 510 when training the machine learning model(s) 104. The machine learning model(s) 104 may use the assigned anchor points 704 to learn to predict the path type(s) 108 (e.g., the confidence values for each anchor point corresponding to the confidence or likelihood that the path geometry 106 associated with the anchor point corresponds to a particular path type).

Now referring to FIGS. 8A-8E, FIGS. 8A-8E include example illustrations of configurations for anchor lines 508 for use as ground truth data 504 for training a machine learning model, in accordance with some embodiments of the present disclosure. The anchor lines 508 may be used to train the machine learning model(s) 104 to predict, for each drivable path, a deviation from one or more anchor lines 508. The anchor lines 508 may be different shapes or geometries (e.g., curved, linear, angled, etc.) to represent different shapes or geometries of drivable paths in the environment. As such, in addition to, or alternatively from, encoding a drivable path to an anchor point 506, the drivable paths may be encoded to an anchor line(s) 508 (that may include any number, N, of anchor points 506). The anchor lines 508 may be generated using polyline curves (e.g., piece-wise linear curves) and/or parameterized curves.

Figure 8B:
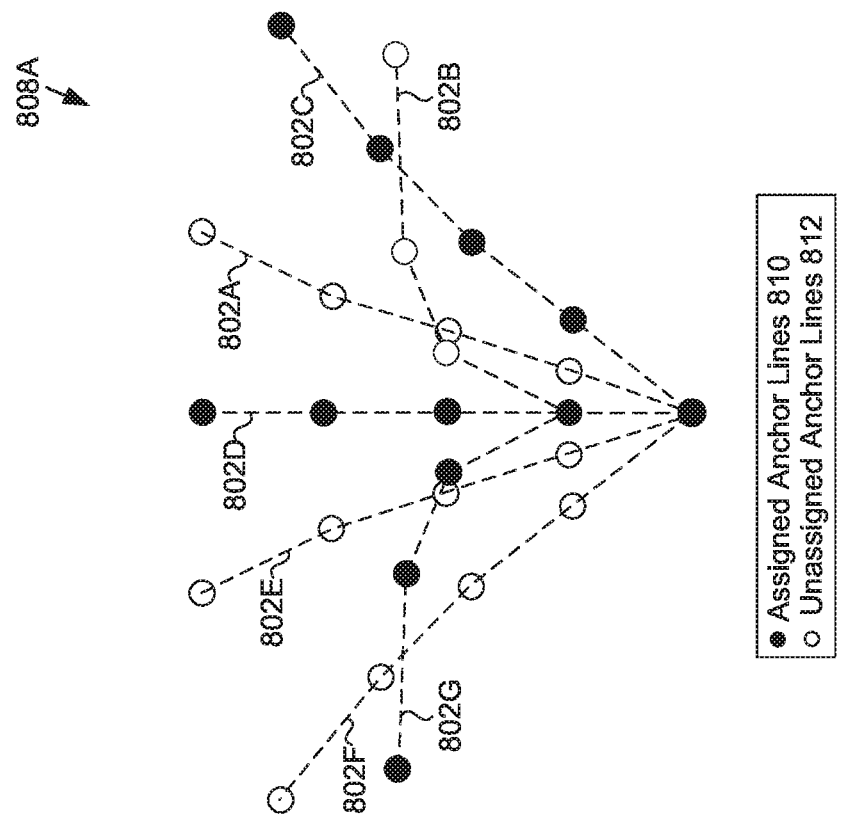
FIGS. 8A-8E include example illustrations of configurations for anchor lines for use as ground truth data for training a machine learning model, in accordance with some embodiments of the present disclosure.
Figure 8A:
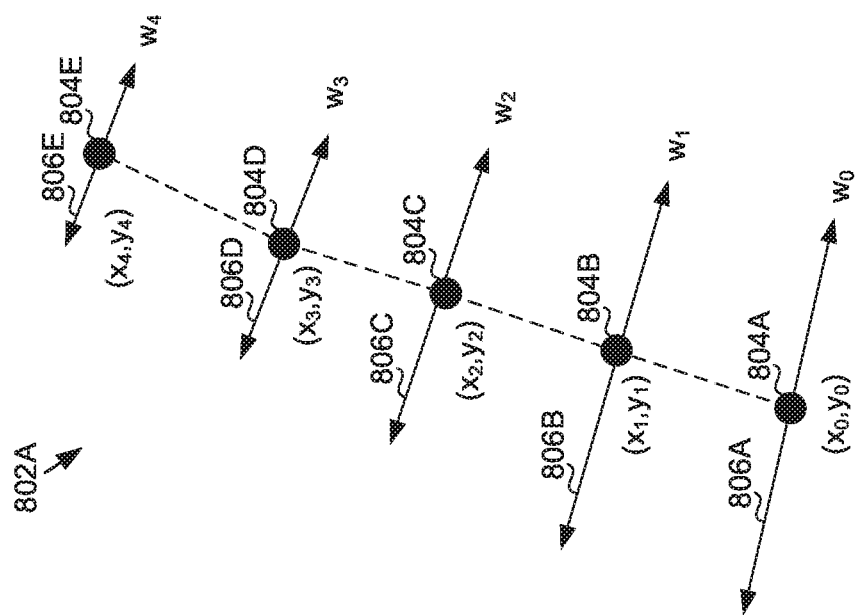

FIG. 8A illustrates an example of an anchor line 802A. The anchor line 802A may include any number N of anchor points 804 (e.g., anchor points 804A-804E in FIG. 8A) and each anchor point 804 may have an associated width 806 (e.g., widths 806A-806E in FIG. 8A). N may be varied, optimized, or otherwise set based on speed and accuracy trade-offs. For example, the greater N is the greater the accuracy may be, and the lower N is the faster the machine learning model(s) 104 may run (e.g., where only a single anchor point 506 is used, increased processing speeds may be achieved). The widths 806 may be defined for each of the anchor points 804 along the anchor line 802A. In some examples, as illustrated in FIG. 8B, a set of anchor lines 808A may be calculated as multiples of the anchor line 802A with different values for the anchor points 804 and different widths 806 (the widths 806 not illustrated in FIG. 8B for clarity). Similarly to the anchor points 704 and 706 of FIG. 7, the anchor lines 802 (e.g., anchor lines 802A-802G) may be assigned anchor lines 810 (e.g., that are encoded to a path label 510 based on having a lowest delta sum, or set of delta sums, for a particular path label 510) or may be unassigned anchor lines 812 (e.g., that are not encoded to a path label 510).

Figure 8C:
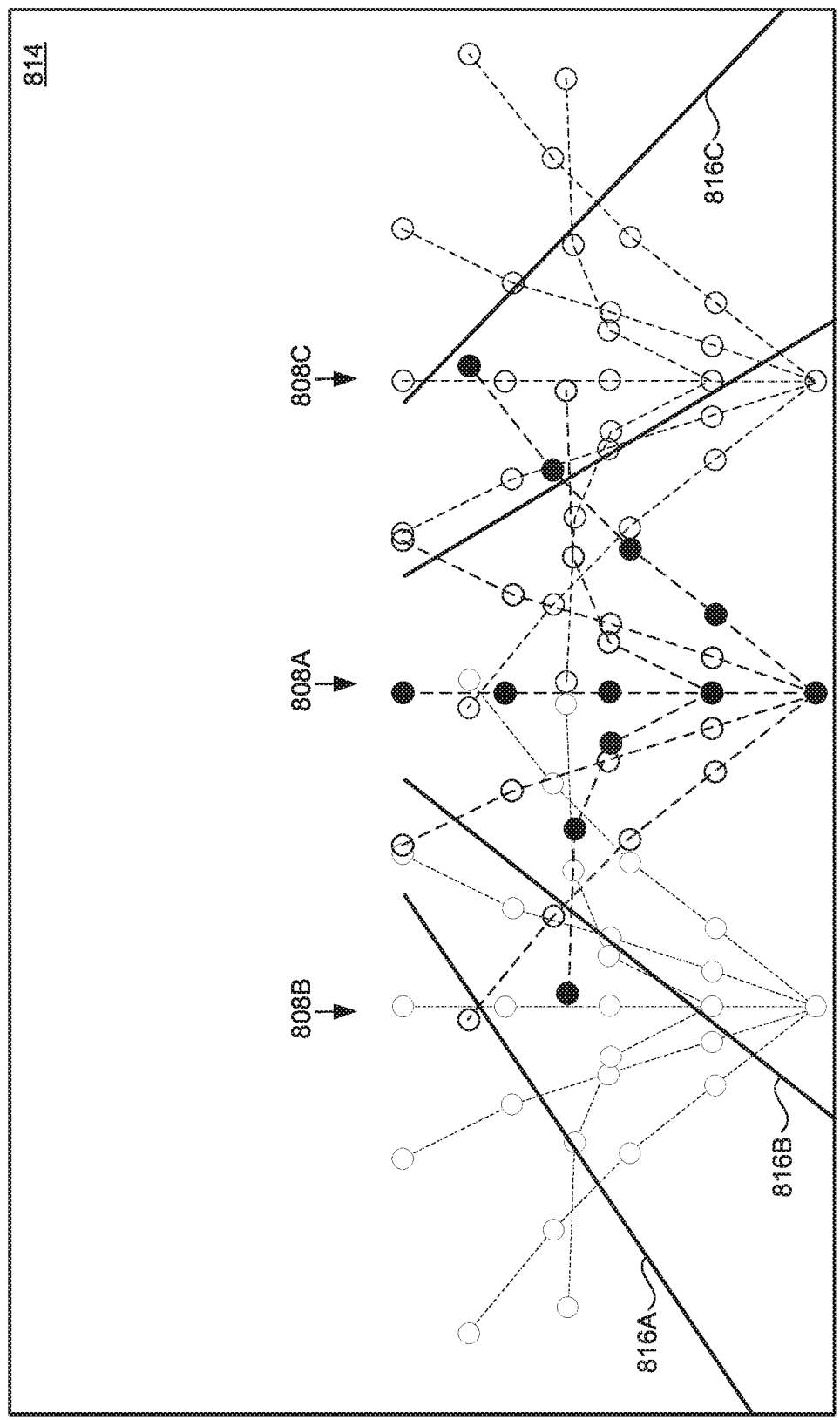

With reference to FIG. 8C, the sets of anchor lines 808 (e.g., sets of anchor lines 808A-808C of FIG. 8C) may be anchored (e.g., at static pixel locations) to an image(s) 814 (e.g., as represented by the sensor data 102). One or more anchor lines 802 of the sets of anchor lines 808 may be encoded to one or more of the path labels 510 (examples of which are indicated by path edges 816A-816C). The machine learning model(s) 104 may be trained to output a set of numbers (e.g., as arrays) for each anchor line 802 at each location in the image 814. The set of numbers may include P confidence values (e.g., from the path type(s) 512), where P may be a number of paths that the machine learning model(s) 104 is trained to predict (e.g., ego-path, left of ego-path, right of ego-path, etc.). The set of numbers may also include XN locations, where X may be based on the number of dimensions of the predicted path geometry (e.g., 2D or 3D), and N may be the number of anchor points 804 associated with each anchor line 802. N, as described herein, may be tuned for accuracy and speed. In some examples, N may be estimated using the ground truth data 504 and may be used to set key performance indicator upper limits for a given N during testing and training (as described in more detail herein, at least with respect to FIGS. 10A-10E). As such, N may be a tunable hyper-parameter for the machine learning model(s) 104.

For each anchor point 804 of each anchor line 802 in the sets of anchor lines 808, a delta sum (in pixel coordinates) may be calculated between vertices of the path labels 510 and the anchor point 804. The delta sums for each anchor point 804 of an anchor line 808 may be summed to compute a sum of delta sums for the anchor line 808. The anchor line 802 with the lowest sum of delta sums for a path label 510 may be encoded to that path label 510. For example, if an ego-path has the lowest sum of delta sums for the anchor line 802 of the set of anchor lines 808A, the ego-path may be encoded to the anchor line 802. This may be repeated until each path label 510 is encoded to at least one anchor line 802.

As an alternative approach to using polyline anchor lines 508, as described with respect to FIGS. 8A-8C, a parameterized approach may be used. The parameterized approach may use parameterized curves such as, without limitation, clothoids or cubic polynomials. In order to generate the anchor lines 508 using the parameterized approach, information about path shapes may be gathered. This information may include some or all of the path labels 510 for the sensor data 102 which may be analyzed to determine common or average shapes. The shapes of the paths may not need to be exact for any particular path, but may capture a general variety of path shapes (or geometries). In some examples, generating the anchor lines 508 may be performed by determining locations for the anchor lines 508 in an image, generating the set of anchor lines 508, and placing the set of anchor lines 508 at each location in the image.

To determine the locations of the anchor lines 508 in the image, a set of anchor lines 508 may be generated and applied at each receptive field location in or more layers of a machine learning model(s) 104. The receptive field locations may be calculated using the topology of the machine learning model(s) 104. For example, layers of the machine learning model(s) 104, where the anchor lines 508 are to be defined, may be indicated. For each of these layers, a spatial extent of the output feature map may be read from the machine learning model(s) 104 (e.g., 20×11 for a machine learning model(s) 104 that is 20×11×512) and a center of each of the receptive fields (e.g., the 20×11 receptive fields) may be found in image coordinates. These locations (e.g., the center of the receptive fields) may form a list of receptive field (x, y) coordinates in the image at which to center the set of anchor lines 508. These locations may be referred to herein as receptive field centers.

The set of anchor lines 508 may be generated as base anchor lines, linear anchor lines, cubic anchor lines, other anchor line types, or a combination thereof. Base anchor lines may be generated based on, for example and without limitation, a linear function or a cubic polynomial function. Linear functions may be useful for highway driving where path shapes may be better defined by straight lines at different angles. Cubic polynomial functions may be useful for curves that are not well defined by lines. A combination of the two types of functions may be useful to capture each of the different path shapes experienced in real-world environments. In some embodiments, a percentage (e.g., 30%, 40%, 50%) of the anchor lines 508 may be linear and another percentage (e.g., 70%, 60%, 50%, 20%) of the anchor lines 508 may be cubic polynomial. As a non-limiting example, more cubic polynomial anchor lines 508 may be used than linear anchor lines 508 due to the larger variety of shapes. However, in other examples, there may be an equal number of cubic and linear, or there may be more linear than cubic. In some embodiments, each base anchor line 508 may be created as one curve, the center line of a path, in a normalized coordinate frame (e.g., the anchor lines 508 have a domain [−1, 1] and are centered at the origin). Each anchor line 508 may have the same number of anchor points 506 (or vertices).

Linear anchor lines may be used to capture linear paths that may be in a wide variety of orientations. An arbitrary number of linear anchor lines 508 may be generated by generating one anchor line along an axis (e.g., the x-axis) spanning from −1 to 1, and this line may be copied and rotate by equally divided angles (the number of lines may be a tunable hyper-parameter) between 0 and π. For example, if two linear anchor lines 508 are to be used, then the anchor lines 508 would include two anchor lines 508 rotated by 0 and π/2, respectively. If four linear anchor lines 508 are to be used, then the anchor lines 508 would include four anchor lines rotated by 0, π/4, π/2, and 3*π/4, respectively, and so on.

Cubic anchor lines 508 may be used to capture curving paths in an image that may take on a variety of curvatures and orientations. Cubic anchor lines 508 may be defined using equation (3), below:

$$y=(\text{root}-x)(\text{root}+x)(a*\text{root}-x)-a*\text{root}^3 \quad (3)$$

Where root indicates the intersection with the x-axis and a is a scaling factor that may be used to adjust the degree of curvature between the +/−roots. The subtraction of "a*root³" at the end of equation (3) may remove the offset such that the curve is centered at the origin. In some non-limiting embodiments, the root may be set such that the distance between the +/−roots varies between 0.5 and 1 and a is a function of the root value and may vary between 28 and 3.5. These values may be determined based on an analysis of the ground truth data 504 and as a result, may change depending on the ground truth data 504 used in the particular embodiment.

Similar to linear anchor lines 508, the cubic anchor lines 508 may be generated at a set of angles to capture different orientations that the paths may be presented after passing the camera lens. As a result, the number of cubic anchor lines 508 may be the product of the number of angles and the number of curvatures (or roots) generated. In a non-limiting example, the cubic anchor lines may be rotated by four angles (e.g., −π/2, −π/4, π/4, and π/2). As a result, if twelve cubic anchor lines 508 are used, then only three curvatures (e.g., root values) may be used and the set of three cubic anchor lines 508 may be rotated our times to product twelve cubic anchor lines 508.

Figure 8D:
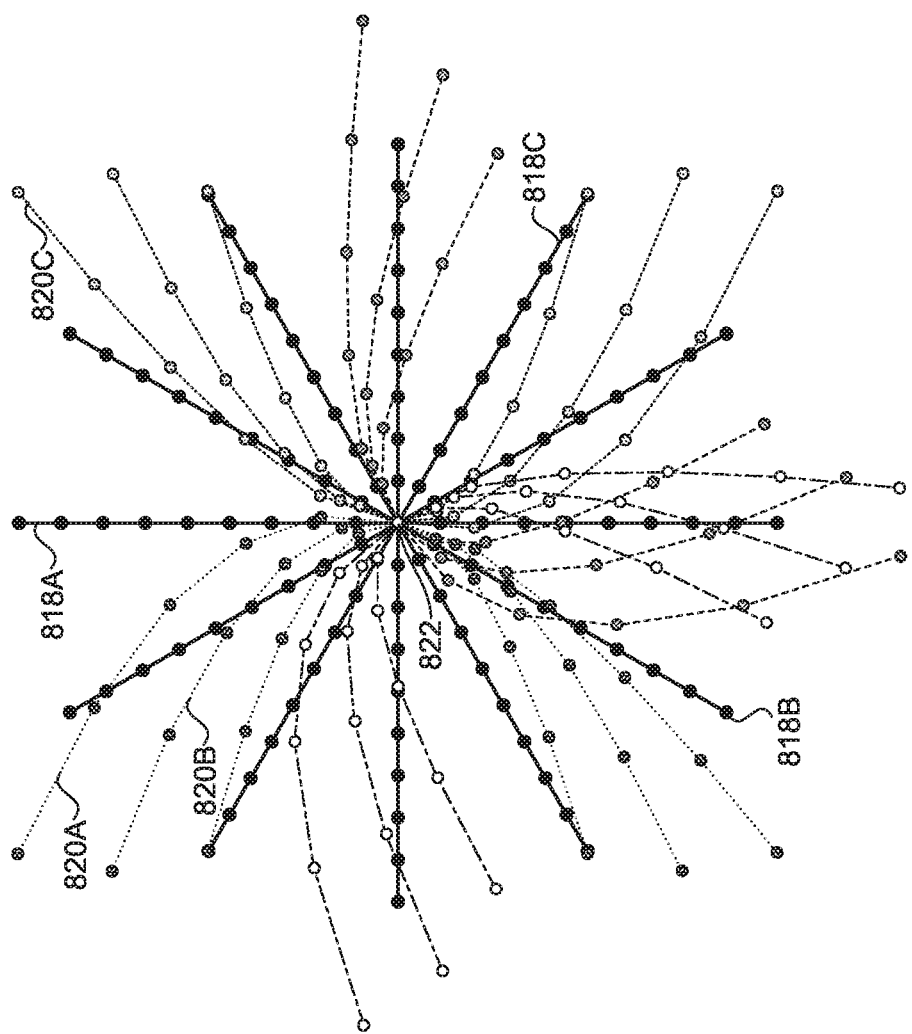

FIG. 8D includes an illustration of linear anchor lines 818 and cubic anchor lines 820. More specifically, FIG. 8D includes, as a non-limiting example, twenty anchor lines 508 including eight linear anchor lines 818 (including linear anchor lines 818A-818C) and twelve cubic anchor lines 820 (including cubic anchor lines 820A-820C). Each set of the anchor lines 818 and 820 may be centered at each origin 822 (or receptive field centers). There may be any number of linear anchor lines 818 and/or cubic anchor lines 820, and there may be any number of sets (e.g., 1, 2, 3, 4, 7, etc.) of the anchor lines 818 and/or 820 associated with the images, as described in more detail herein.

The set(s) of anchor lines 508 may be placed, or associated with, locations in the image(s) (e.g., as represented by the sensor data 102). For example, once the base anchor lines are generated, the base anchor lines may be copied and translated to each of the receptive field locations identified to produce the anchor lines in image or pixel coordinates. The anchor lines 508 may be scaled to match the image or spatial resolution and/or aspect ratios such that the anchor lines 508 may have similar lengths to the lengths of the path labels 510 in the image coordinates. The values used for scaling may be determined from an analysis of the ground truth data 504, in some embodiments. Copying the anchor lines 508 to each of the one or more receptive field locations is useful for integration with a machine learning model(s) 104—and specifically with a convolutional neural network (CNN)—but creates a large number of anchor lines 508 that is equal to the number of base anchor lines 508 times the number of receptive field locations. For a non-limiting example, where 20 base anchor lines 508, and 20×11 receptive field locations are used, there would be 4,400 total anchor lines (e.g., 20×20×11). In some examples, the number of anchor lines 508 may be greater than 10,000. As described herein, the number of anchor lines 508 and/or anchor points 506 may be determined to generate accurate results for a machine learning model(s) 104 that is capable of executing in real-time (e.g., at 30 frames per second (fps), 60 fps, or greater, depending on the embodiment).

Once the set of base anchor lines 508 have been generated, translated, and/or scaled, edge anchor lines may be calculated by finding points one-half width away from the base anchor lines along the normal to the base anchor line. The width of the anchor lines 508 (e.g., the width 806 as described in FIG. 8A) may be calculated from the (x, y) coordinate of the base anchor line after translation and/or scaling as a function of the image width and the image height (e.g., the spatial resolution). In some examples, the width map may be generated by fitting a two-dimensional paraboloid to the widths measured from the ground truth data 504 (e.g., the path labels 510).

Figure 8E:
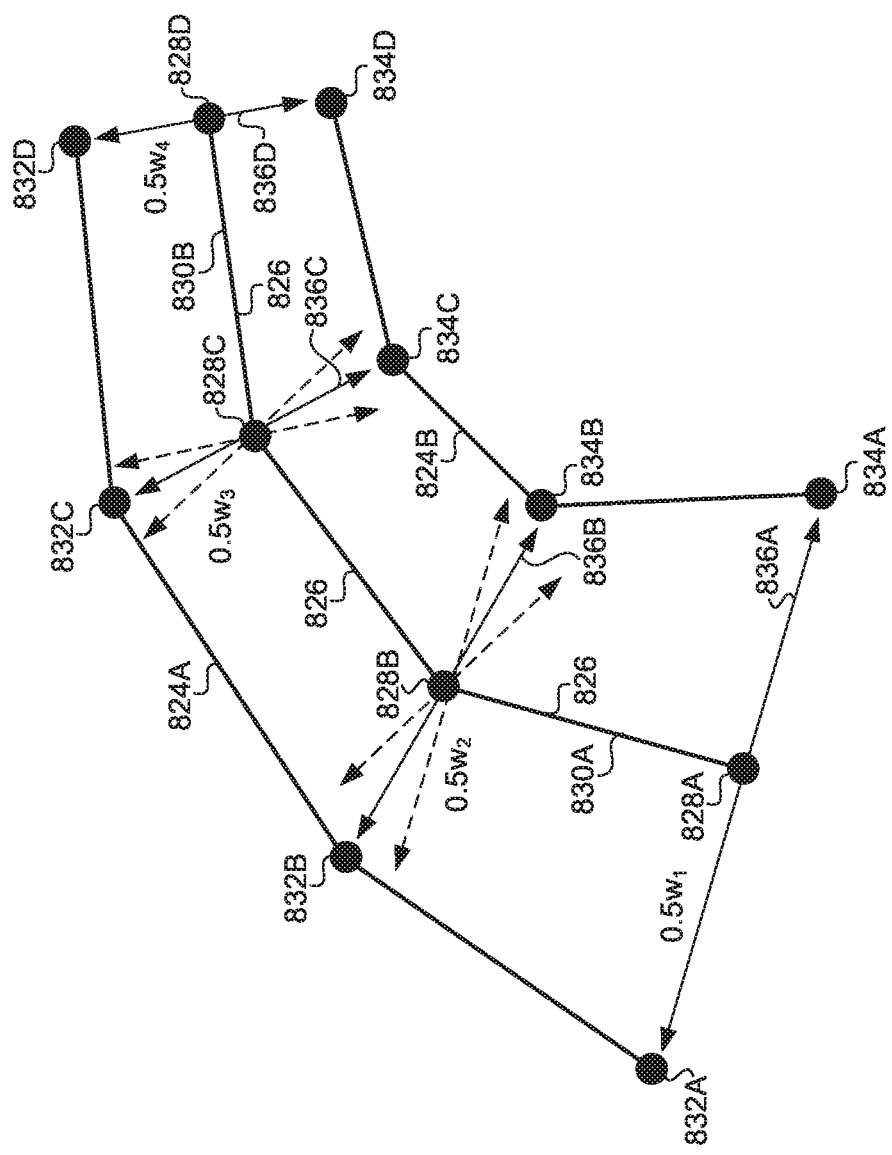

For example, and with reference to FIG. 8E, edge anchor lines 824A and 824B of the path may be defined by a normal 836 (e.g., normal 836A-836D of FIG. 8E) to a base anchor line 826 at each anchor point 828 (e.g., anchor points 828A-828D of FIG. 8E) of the base anchor line 826. For the initial anchor point (e.g., anchor point 828A) and the final anchor point (e.g., anchor point 828D), the normal to an initial line segment 830A and a final line segment 830B, respectively, may be used as the normal. For the points in between two line segments (e.g., anchor point 828B and 828C), the mean of the normal vectors to each segment may be used to find the bisecting, or normal, vector to the base anchor line 826 at that point. Once the normal vector and the width for the anchor point 828 are found, a point to the left and right of the anchor point 828, located one-half width in each direction, may be assigned as the left edge anchor point 832 (e.g., left edge anchor points 832A-832D of FIG. 8E) and the right edge anchor point 834 (e.g., right edge anchor points 834A-834D of FIG. 8E). The edge anchor lines 828 may form the left and right path edges.

Once the anchor lines 508 are determined, a determination may be made to ensure that all of the anchor lines 508 and/or anchor points 506 are included within the image. For example, as a result of translating, scaling, and/or shifting, the anchor lines 508 and/or anchor points 506 may no longer resemble the linear and cubic functions generated at the start, and thus may not fit within the image anymore. In some embodiments, to ensure that the anchor points 506 and/or the anchor lines 508 are within the image, intersections between image boundaries and the anchor lines 506 may be determined (if any), and then the anchor lines 508 may be interpolated within the boundaries of the image if intersections are found.

In order to interpolate an anchor line 508, the anchor line 508 should still form a function (e.g., for each x value, there should be only one y-value). However, since the anchor lines 508 have been rotated and scaled, this may no longer be true. As a result, to find the intersections, the scaling and rotating applied to the anchor lines 508 may be reversed and the same reverse scaling and rotating may be applied to the image boundaries. This may ensure that the anchor line 508 is now a function. The reason for performing rotations and scaling first may be to take into account the path edges and widths because without first rotating, scaling, and expanding the anchor line 508 along the normal vectors, the wrong curves for finding intersections may be used.

To determine whether the anchor line 508 intersects the boundary of the image, each line segment (e.g., polyline) of the anchor line(s) 508 may be checked with each boundary segment of the image to determine if an intersection is present. If there is an intersection, the x coordinate of the intersection may be preserved as a limit for the x values of interpolation. Once all the boundary intersections are found, the intersections that form the initial and final x coordinates for interpolation may be determined. Where an intersection is found, the anchor line 508 may be interpolated between the x coordinate limits and the new anchor lines 508 may be generated for association with the image. Once the new anchor line 508 is interpolated, the rotation and scaling may be reapplied to the anchor line 508 to place the anchor line 508 back into the image coordinate frame as a final anchor line 508. If no intersection is found, the original initial and final x values may be added instead.

The machine learning model(s) 104 may perform forward pass computations on the sensor data 102 (e.g., before or after augmentation and/or before or after pre-processing). In some examples, the machine learning model(s) 104 may extract features of interest from the image(s) and predict a path geometry(ies) 106 corresponding to each anchor point and/or anchor line, and a probability or confidence for each path geometry—corresponding to each anchor point and/or each anchor line—that the path geometry corresponds to a path type(s) 108. A loss function 502 may be used to measure loss (e.g., error) in the outputs (e.g., predictions generated by the machine learning model(s) 104) as compared to the ground truth data 504. Any type of loss function may be used, such as cross entropy loss, mean squared error, mean absolute error, mean bias error, and/or other loss function types. In some embodiments, different outputs (e.g., path type(s) 108 and path geometry(ies) 106) may have different loss functions. For example, the path geometry(ies) 106 predicted by the machine learning model(s) 104 may use a first loss function and the path type(s) 108 may use a second loss function (e.g., different from the first loss function). In such examples, the loss functions may be combined to form a total loss, and the total loss may be used to train (e.g., update the parameters of) the machine learning model(s) 104. In any example, backward pass computations may be performed to recursively compute gradients of the loss function(s) 502 with respect to training parameters. In some examples, weight and biases of the machine learning model(s) 104 may be used to compute these gradients.

Figure 9:
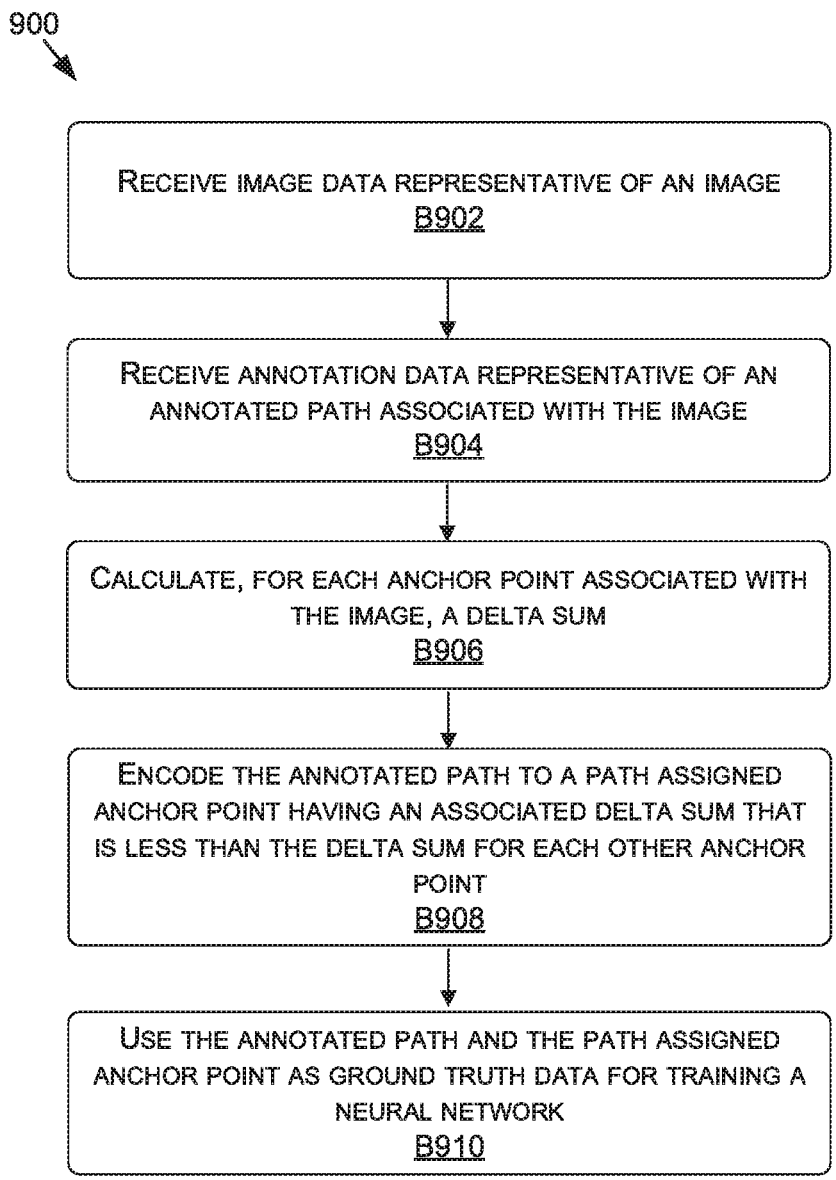
FIG. 9 is a flow diagram showing a method for training a machine learning model for path detection, in accordance with some embodiments of the present disclosure.

Now referring to FIG. 9, each block of method 900, described herein, comprises a computing process that may be performed using any combination of hardware, firmware, and/or software. For instance, various functions may be carried out by a processor executing instructions stored in memory. The method 900 may also be embodied as computer-usable instructions stored on computer storage media. The method 900 may be provided by a standalone application, a service or hosted service (standalone or in combination with another hosted service), or a plug-in to another product, to name a few. In addition, method 900 is described, by way of example, with respect to the process 500 of FIG. 5. However, the method 900 may additionally or alternatively be executed by any one system, or any combination of systems, including, but not limited to, those described herein.

FIG. 9 is a flow diagram showing a method 900 for training a machine learning model for path detection, in accordance with some embodiments of the present disclosure. The method 900, at block B902, includes receiving image data representative of an image. For example, the sensor data 102 (as image data) may be received, where the image data is representative of an image.

The method 900, at block B904, includes receiving annotation data representative of an annotated path associated with the image. For example, path label(s) 510 may be received that are associated with the image.

The method 900, at block B906, includes calculating, for each anchor point associated with the image, a delta sum. For example, a delta sum may be calculated for each anchor point associated with an image.

The method 900, at block B908, includes encoding the annotated path to a path assigned anchor point having an associated delta sum that is less than the delta sum for each other anchor point. For example, the path label(s) 510 for a specific path type may be encoded to an anchor point 506 having an associated delta sum that is less than the delta sum for each other anchor point 506 with respect to the path label 510 for the specific path type (e.g., the ego-path, left of ego-path, etc.). The encoded anchor point 506 may be referred to as a path assigned anchor point, or an assigned anchor point 704 as illustrated in FIG. 7.

The method 900, at block B910, includes using the annotated path and the path assigned anchor point as ground truth data for training a neural network. For example, the path label(s) 510, the anchor points 506, the anchor lines 508, the path type(s) 512, and/or the assigned anchor points may be used as ground truth for training the machine learning model(s) 104.

Key Performance Indicators (KPIs)

Figure 10A:
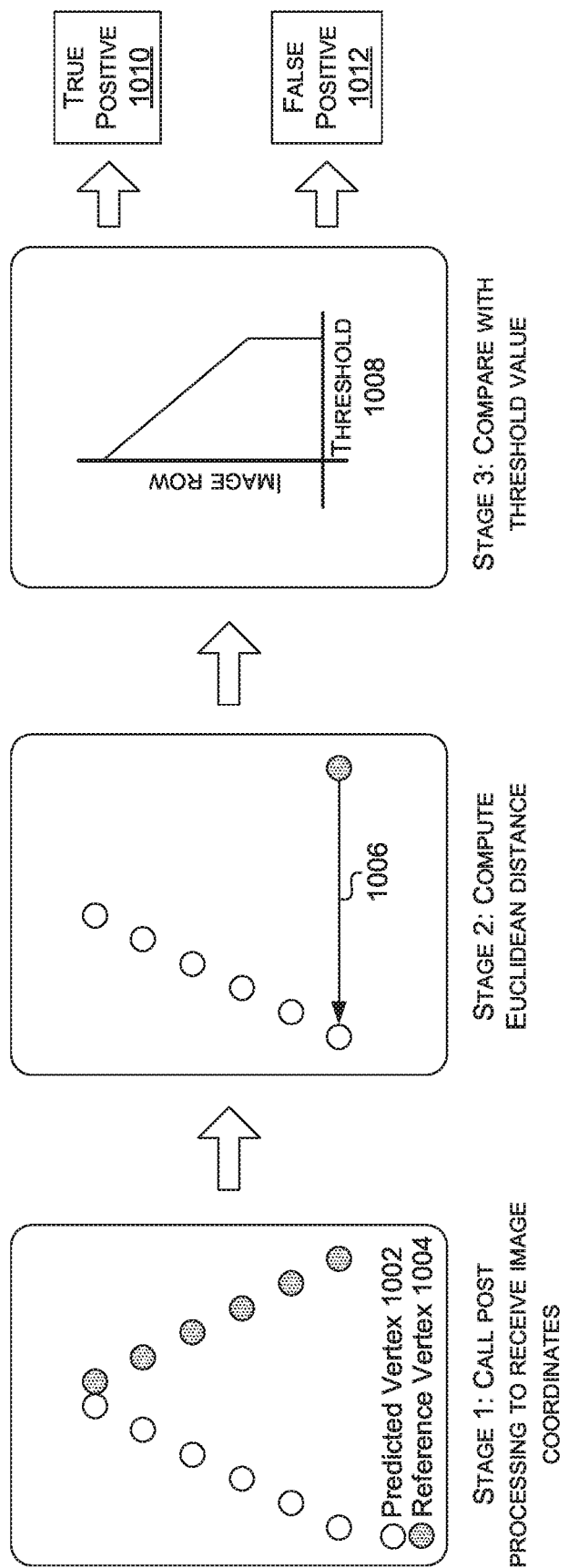

FIGS. 10A-10E include example illustrations of key performance indicators (KPIs), in accordance with some embodiments of the present disclosure. With reference to FIG. 10A, an example of a point-based KPI is illustrated. A distance 1006 between each predicted point 1002 or vertex in a path may be compared to its corresponding reference point 1004 on a reference path (e.g., the path label 510) and a threshold distance 1008 may be used to compute true positives 1010 and false positives 1012. In some examples, precision and recall may then be computed over all the points without any grouping into paths.

Since the output of the machine learning model(s) 104 may include curves and widths, the KPIs for curve output and width output show in FIGS. 10B-10E may be used. Similar KPIs may be used for the path rail and lane edge predictions. In addition, in some embodiments, mean average precision may be used to address whether all paths are captured, with the absolute error as a metric of acceptance (or the Frechet distance) rather than the intersection over union typically used in detection networks.

With reference to FIG. 10B, a curve output KPI is illustrated. The metrics may be in both image space and birds-eye-view space. Whether using regression, segmentation, or detection based-methods, the end product may be a predicted curve. The curve may represent the center of a rail 1014 of the path and the path width at number of points or vertices along the path. It may be more interpretable to measure the error in the center rail curve and the width than the edges 1016. A non-limiting example may include two parallel edges 1016A and 1016B that both have a concave protrusion 1018A and 1018B, respectively, at some location. The curve of the center rail 1014 may still be correct and only the width may be incorrect, which may not be captured by measuring error in the edges 1016. The ground truth path labels may be necessarily ambiguous when there are no lane markings (e.g., there may be a high degree of variance in the edges selected by a group of individual annotators). As a result, the KPI on the center rail 1014 and width derived from these annotations may take into account the inherent uncertainty in ground truth. The importance of getting the center rail 1014 and width correct in near space (e.g., closer to the vehicle) is greater than in the far space (e.g., farther from the vehicle). In addition, what the lateral distance metric captures is the errorM meters out along a straight path assuming that the vehicle is currently located at any point laterally. Instead, the error M meters out if the vehicle were to follow a certain path is captured.

Figure 10C:
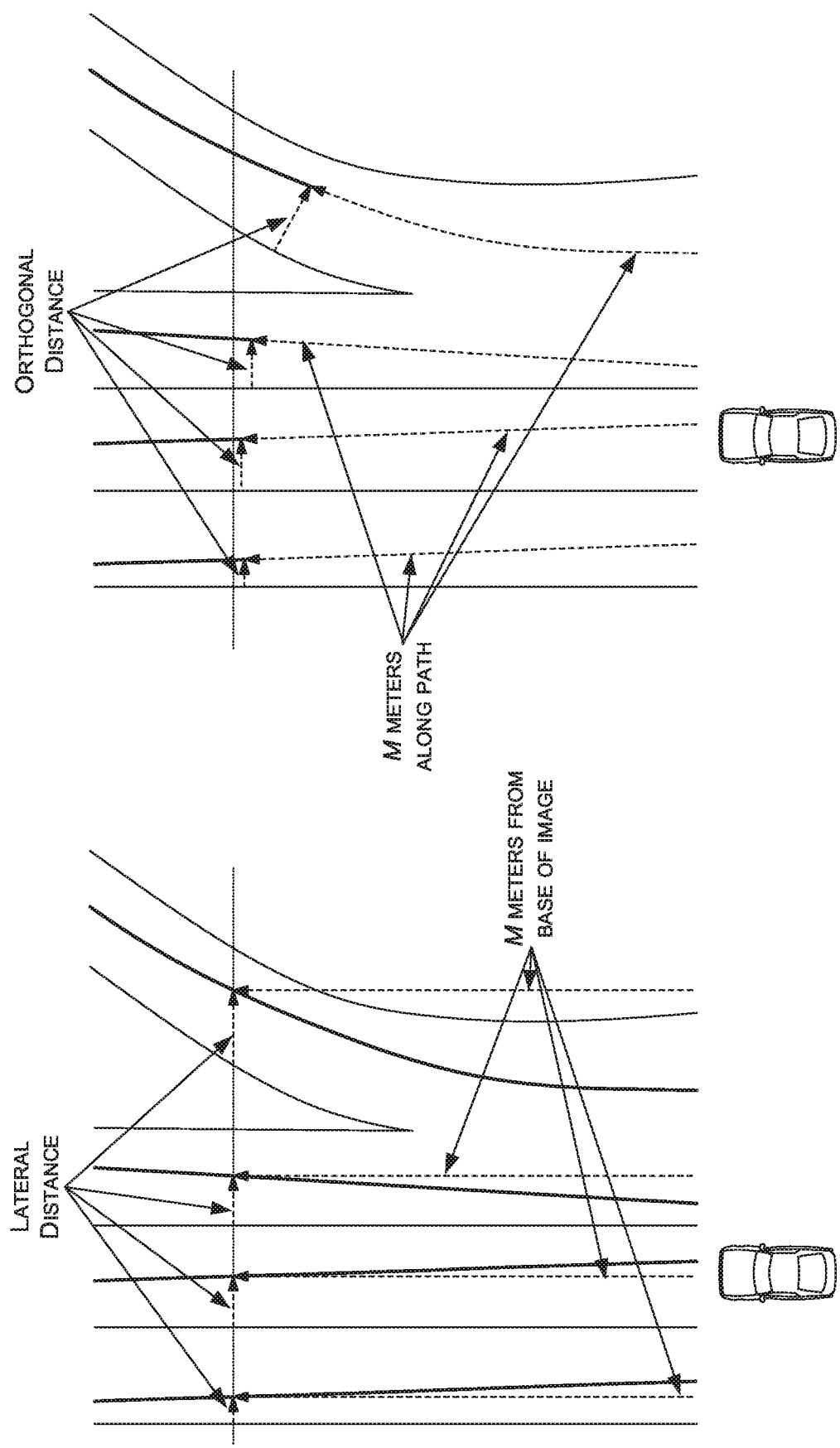
Figure 10E:
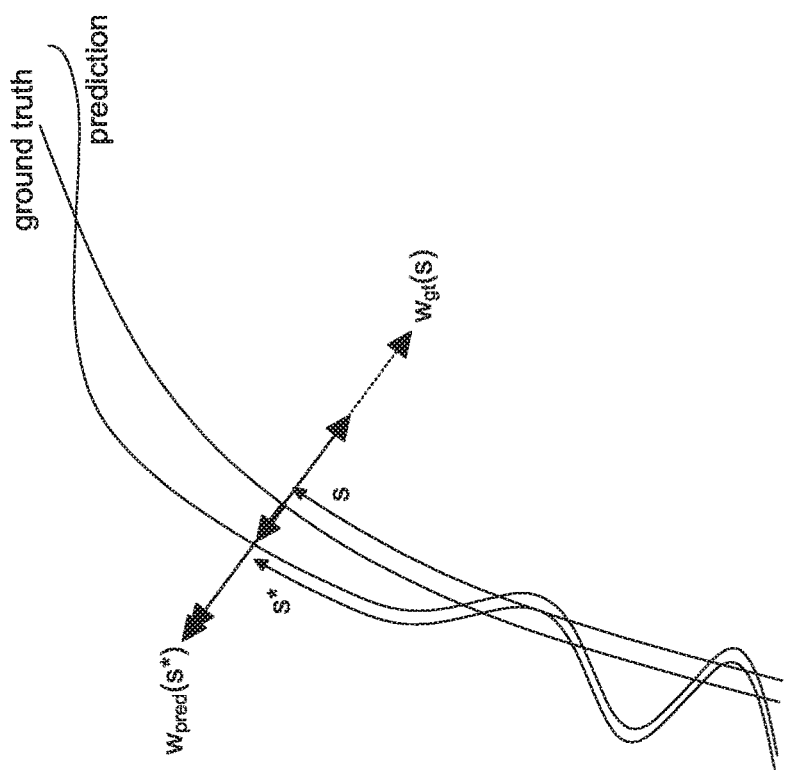

As such, it may be preferable that the metric captures the distance between the predicted path and the ground truth path assuming the vehicle has travelled that path. To provide users with a metric M meters out, the error when the front of the presumed vehicle is M meters out along the arc length of the predicted path is calculated (as illustrated in FIG. 10C). Orthogonal distance error may be used to solve the problem of how far off of a predicted path a vehicle would be if the vehicle were M meters/pixels out along the ground truth path. To measure the error M meters/pixels along a path, the distance between the ground truth curve and the predicted curve measured along the normal to the ground truth curve at fixed distances along the curve in image coordinates may be used. The error may be weighted by the distance along the path to reflect that closer points on the path may be more important to get correct than those that are farther out. In some examples, the orthogonal distance error (Orth_Dist_Err) may be calculated using equation (4), below:

$$\text{Orth\_Dist\_Err} = \Sigma_s \sqrt{P-s} \sqrt{(x_{gt}(s)) - x_{pred}(s^*))^2 + (y_{gt}(s) - y_{pred}(s^*))^2} \quad (4)$$

where s is the arc length along the predicted path, s* is the arc length along the predicted curve where the normal to the ground truth curve at s and the predicted curve intersect (see FIG. 10D), and P is the total path length of the given path.

Figure 10D:
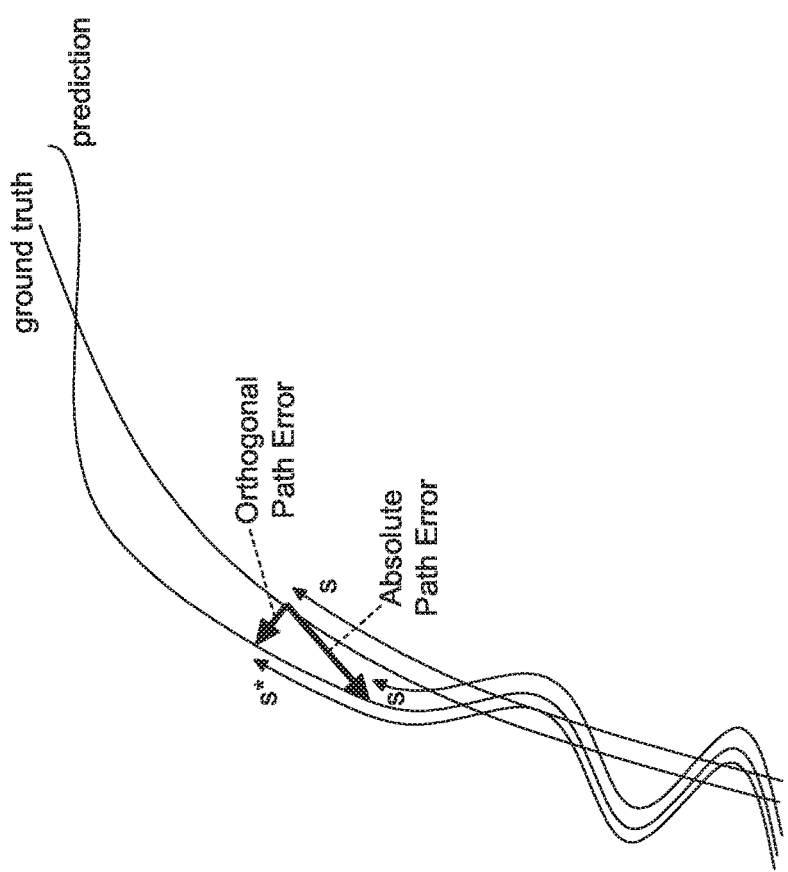

Absolute distance error may be used to solve the problem of how far the vehicle would be from where it should be if the vehicle had traveled M meters/pixels on the predicted path rather than M meters/pixels along the ground truth path. To measure this, the distance between points on the ground truth and predicted path at the same arc length, s, may be computed. The error may be weighted along the path such that points closer to the vehicle are more important than those farther out from the vehicle, similar to described above with orthogonal path error. In some examples, the absolute distance error (Abs_Dist_Err) may be calculated using equation (5), below:

$$\text{Abs\_Dist\_Err} = E_s \sqrt{P-s} \sqrt{(x_{gt}t(s)) - x_{pred}(s)^2 + (y_{gt}(S) - y_{pred}(s))^2} \quad (5)$$

where s is the arc length along the predicted path and P is the total path length of the given path. As illustrated in FIG. 10D, per image KPIs may be generated by averaging the path errors for all paths in an image.

To measure the error in the width estimate of the path, a width error metric may be used. At a given number of points or vertices along the path, the width estimates may be compared. For this metric, it may be important to be measuring the estimates at the equivalent arc length of the ground truth path, s*, since the goal is to dissociate the width error from the center path error. As such, penalizing the width metric if the center path is in the wrong place should be avoided. For this metric, the sum square error in the widths along the path may be used. The width error metric may be illustrated with respect to FIG. 10E. The metric may be weighted by the length along the path to prioritize locations closer to the vehicle, similar to described above with respect to orthogonal distance error and absolute distance error. In some examples, the width error metric (W_Err) may be calculated using equation (6), below:

$$W\_\text{Err} = \Sigma_s \sqrt{P-s}(w_{gt}(s) - w_{pred}(s^*))^2 \quad (6)$$

where s is the arc length along the predicted path, s* is the arc length along the predicted curve where the normal to the ground truth curve at s and the predicted curve intersect (see FIG. 10E), and P is the total path length of the given path.

Example Autonomous Vehicle

FIG. 11A is an illustration of an example autonomous vehicle 1100, in accordance with some embodiments of the present disclosure. The autonomous vehicle 1100 (alternatively referred to herein as the "vehicle 1100") may include a passenger vehicle, such as a car, a truck, a bus, and/or another type of vehicle that accommodates one or more passengers. Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. For example, the vehicle 1100 may be capable of conditional automation (Level 3), high automation (Level 4), and/or full automation (Level 5), depending on the embodiment.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1122 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1122), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the HD map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 that may use one or more wireless antenna(s) 1126 and/or modem(s) to communicate over one or more networks. For example, the network interface 1124 may be capable of communication over LTE, WCDMA, UMTS, GSM, CDMA2000, etc. The wireless antenna(s) 1126 may also enable communication between objects in the environment (e.g., vehicles, mobile devices, etc.), using local area network(s), such as Bluetooth, Bluetooth LE, Z-Wave, Zig-Bee, etc., and/or low power wide-area network(s) (LPWANs), such as LoRaWAN, SigFox, etc.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 1120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may any number of wide-view cameras 1170 on the vehicle 1100. In addition, long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

One or more stereo cameras 1168 may also be included in a front-facing configuration. The stereo camera(s) 1168 may include an integrated control unit comprising a scalable processing unit, which may provide a programmable logic (FPGA) and a multi-core microprocessor with an integrated CAN or Ethernet interface on a single chip. Such a unit may be used to generate a 3-D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360-degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 that may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HEM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal-processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real0time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is powered on and active doing 3D rendering, the video image compositor may be used to offload the GPU(s) 1108 to improve performance and responsiveness.

The SoC(s) 1104 may further include a mobile industry processor interface (MIPI) camera serial interface for receiving video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with peripherals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-performance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detection and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124, which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front-end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS and/or assisted GPS sensors), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short-range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example.

In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 1120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network that is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, WiFi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT 3). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
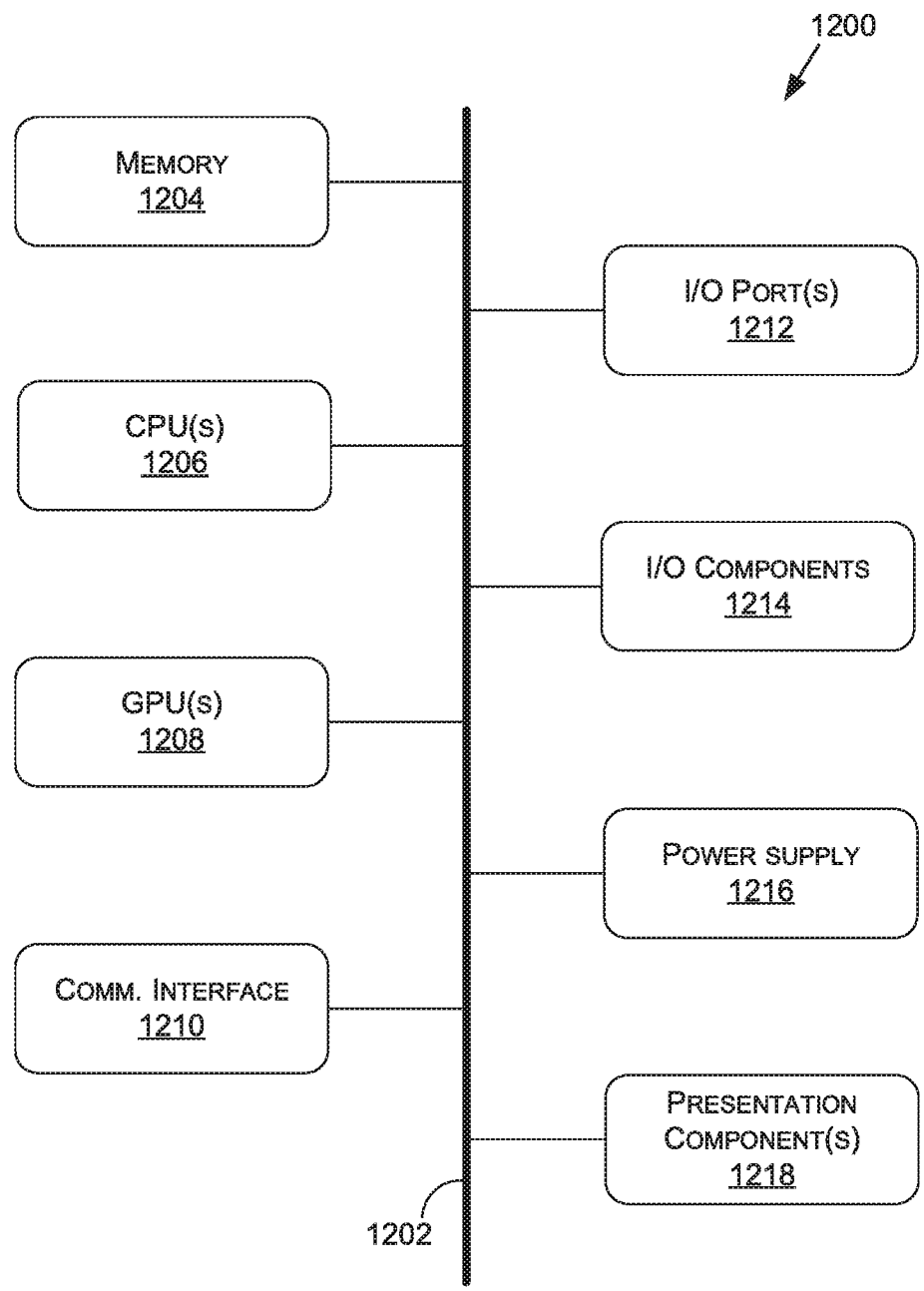
FIG. 12 is a block diagram of an example computing device suitable for use in implementing some embodiments of the present disclosure.

FIG. 12 is a block diagram of an example computing device 1200 suitable for use in implementing some embodiments of the present disclosure. Computing device 1200 may include a bus 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, and one or more presentation components 1218 (e.g., display(s)).

Although the various blocks of FIG. 12 are shown as connected via the bus 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The bus 1202 may represent one or more busses, such as an address bus, a data bus, a control bus, or a combination thereof. The bus 1202 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an ARM processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

The GPU(s) 1208 may be used by the computing device 1200 to render graphics (e.g., 3D graphics). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data. The display memory may be included as part of the memory 1204. The GPU(s) 708 may include two or more GPUs operating in parallel (e.g., via a link). When combined together, each GPU 1208 may generate pixel data for different portions of an output image or for different output images (e.g., a first GPU for a first image and a second GPU for a second image). Each GPU may include its own memory, or may share memory with other GPUs.

In examples where the computing device 1200 does not include the GPU(s) 1208, the CPU(s) 1206 may be used to render graphics.

The communication interface 1210 may include one or more receivers, transmitters, and/or transceivers that enable the computing device 1100 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   receiving image data representative of a field of view of an image sensor;
   applying an image represented by the image data to a neural network;
   computing, using the neural network and for an individual anchor point of an anchor line associated with the image, a set of delta values between the individual anchor point and a vertex of one or more vertices of a predicted path in the field of view, an individual delta value of the set of delta values corresponding to a distance from the individual anchor point to the vertex of the one or more vertices;
   generating a geometry for the predicted path with respect to the image based at least in part on the set of delta values;
   determining, based at least in part on a confidence value computed using the neural network, a path class that corresponds to the predicted path; and
   using the geometry and the path class to perform one or more operations by an autonomous vehicle.

2. The method of claim 1, wherein the individual anchor point is a first individual anchor point, the anchor line is a first anchor line, the set of delta values are a first set of delta values, the geometry is a first geometry, the predicted path is a first predicted path, the vertex is a first vertex, the one or more vertices are one or more first vertices, the confidence value is a first confidence value, and the method further comprises:
   computing, using the neural network and for a second individual anchor point of a second anchor line associated with the image, a second set of delta values between the second individual anchor point and a second vertex of one or more second vertices of a second predicted path, an individual second delta value of the second set of delta values corresponding to a distance from the second individual anchor point to the second vertex of the one or more second vertices;
   generating a second geometry for the second predicted path with respect to the image based at least in part on the second set of delta values; and
   determining, based at least in part on a second confidence value computed using the neural network being less than the first confidence value, that the second predicted path does not correspond to the path class.

3. The method of claim 1, wherein the neural network computes one or more sets of delta values for an individual anchor line of a plurality of anchor lines, and further computes one or more confidence values representative of a likelihood that the individual anchor line of the plurality of anchor lines corresponds to an individual path class of a plurality of path classes.

4. The method of claim 1, wherein the anchor line is one of a linear anchor line or a cubic polynomial anchor line.

5. A method comprising:
applying image data to a neural network, the image data representing an image;
computing, using the neural network and for an individual anchor point of one or more anchor points associated with the image data:
one or more delta values representative of one or more distances between a location within the image that is associated with the individual anchor point and one or more locations within the image that are associated with one or more vertices of a predicted path; and
one or more confidence values representative of a confidence that the predicted path corresponds to an individual path class of one or more path classes;
generating a geometry for the predicted path based at least in part on the one or more delta values;
assigning a path class of the one or more path classes to the predicted path based at least in part on the one or more confidence values; and
using the geometry and the path class to perform one or more operations by a vehicle within a physical environment.

6. The method of claim 5, wherein the one or more anchor points include a plurality of anchor points arranged in a grid pattern at static pixel locations with respect to the image represented by the image data.

7. The method of claim 5, wherein the one or more delta values include a set of delta values, the set of delta values including one or more first delta values between the individual anchor point and the one or more vertices in a first direction and one or more second delta values between the individual anchor point and the one or more vertices in a second direction.

8. The method of claim 5, wherein the one or more path classes include a plurality of path classes, the plurality of path classes including a vehicle path of the vehicle and one or more related paths relative to the vehicle path.

9. The method of claim 5, wherein the assigning the path class to the predicted path includes determining that a confidence value of the one or more confidence values for the path class for the individual anchor point is greater than one or more second confidence values for the path class for one or more second anchor points.

10. The method of claim 5, wherein the one or more vertices correspond to one or more points of at least one polyline, and the geometry represents a polygon formed by connecting the one or more points to form the at least one polyline.

11. The method of claim 5, wherein the predicted path includes a first polyline and a second polyline laterally spaced from the first polyline, and the method further comprises:
computing a center polyline extending between and along the first polyline and the second polyline,
wherein the using the geometry includes using the center polyline.

12. The method of claim 5, wherein the predicted path includes a center polyline, and the method further comprises:
computing a first polyline and a second polyline based at least in part on the center polyline, the first polyline and the second polyline being spaced substantially equidistant from the one or more vertices of the center polyline,
wherein the using the geometry includes using the first polyline and the second polyline as input to perform the one or more operations by the vehicle.

13. A processor comprising:
processing circuitry to:
based at least in part on sensor data generated using one or more sensors of a machine, compute, using a neural network and for an individual anchor point of a plurality of one or more anchor points associated with the sensor data:
a set of delta values representative of distances between the individual anchor point and a vertex of one or more vertices of a predicted path; and
one or more confidence values representative of a confidence that the predicted path corresponds to one or more path classes;
generate a geometry for the predicted path based at least in part on the set of delta values;
assign a path class of the one or more path classes to the predicted path based at least in part on the one or more confidence values; and
use the geometry and the path class to perform one or more operations by the machine within a physical environment.

14. The processor of claim 13, wherein the one or more anchor points include a plurality of anchor points arranged in a grid pattern at static pixel locations with respect to an image represented by the sensor data.

15. The processor of claim 13, wherein the set of delta values includes one or more first delta values between the individual anchor point and the one or more vertices in a first direction and one or more second delta values between the individual anchor point and the one or more vertices in a second direction.

16. The processor of claim 13, wherein the one or more path classes include a plurality of path classes, the plurality of path classes including a vehicle path of the vehicle and one or more related paths relative to the vehicle path.

17. The processor of claim 13, wherein the assigning the path class to the predicted path includes determining that a confidence value of the one or more confidence values for the path class for the individual anchor point is greater than one or more additional confidence values for the path class for one or more additional anchor points.

18. The processor of claim 13, wherein:
the one or more anchor points include a plurality of anchor points;
the one or more path classes include a plurality of path classes;
the neural network computes a respective path class for each of the plurality of anchor points; and
each respective path class of the plurality of path classes is assigned to a respective anchor point having a highest confidence value for the respective path class.

19. The processor of claim 13, wherein the one or more vertices correspond to one or more points of at least one polyline, and the geometry represents a polygon formed by connecting the one or more points to form the at least one polyline.

20. The method of claim 5, wherein:
the location within the image that is associated with the individual anchor point is a pixel location within the image that is associated with the individual anchor point;
the one or more locations within the image that are associated with the one or more vertices of the predicted path are one or more pixel locations within the image that are associated with the one or more vertices of the predicted path; and the one or more distances are one or more pixel distances between the pixel location within the image that is associated with the individual anchor point and the one or more pixel locations within the image that are associated with the one or more vertices of the predicted path.

* * * * *